| (12) | United States Patent | (10) Patent No.: | US 9,516,379 B2 |
|---|---|---|---|
| | Chen et al. | (45) Date of Patent: | Dec. 6, 2016 |

(54) BUFFER MANAGEMENT IN VIDEO CODECS

(75) Inventors: Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 13/412,377

(22) Filed: Mar. 5, 2012

(65) Prior Publication Data

US 2012/0230401 A1    Sep. 13, 2012

Related U.S. Application Data

(60) Provisional application No. 61/450,572, filed on Mar. 8, 2011.

(51) Int. Cl.

| H04N 7/26 | (2006.01) |
|---|---|
| H04N 21/44 | (2011.01) |
| H04N 21/845 | (2011.01) |
| H04N 19/70 | (2014.01) |

(Continued)

(52) U.S. Cl.
CPC ...... *H04N 21/44016* (2013.01); *H04N 19/426* (2014.11); *H04N 19/573* (2014.11); *H04N 19/70* (2014.11); *H04N 21/8455* (2013.01)

(58) Field of Classification Search
CPC ................ H04N 19/00884; H04N 21/44016
USPC .................................................... 375/240.12
See application file for complete search history.

(56) References Cited

U.S. PATENT DOCUMENTS

| 7,839,895 B2 | 11/2010 | Sullivan et al. |
| 8,050,328 B2 | 11/2011 | Iguchi et al. |

(Continued)

FOREIGN PATENT DOCUMENTS

| JP | 2005516496 A | 6/2005 |
| WO | 2004008735 A2 | 1/2004 |

(Continued)

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

(Continued)

*Primary Examiner* — Christopher S Kelley
*Assistant Examiner* — Jonathan Messmore
(74) *Attorney, Agent, or Firm* — Shumaker & Sieffert, P.A.

(57) ABSTRACT

In one example, a video decoder is configured to determine, from data associated with an open decoding refresh (ODR) picture of video data, an identifier for a previous picture of the video data, determine whether the previous picture is currently stored in a reference picture memory, and decode only data for pictures of the video data having display order values that are greater than a display order value of the ODR picture, when the previous picture is not stored in the reference picture memory. In another example, a video encoder is configured to encode an open decoding refresh (ODR) picture, determine a previously coded picture having a display order value less than a display order value of the ODR picture and having a temporal identifier value equal to zero, and signal syntax data for the ODR picture representative of an identifier of the determined previously coded picture.

40 Claims, 10 Drawing Sheets

(51) Int. Cl.
H04N 19/426 (2014.01)
H04N 19/573 (2014.01)

(56) References Cited

U.S. PATENT DOCUMENTS

| | | | |
|---|---|---|---|
| 8,493,126 | B2 | 7/2013 | Sankaranarayanan et al. |
| 2004/0066854 | A1* | 4/2004 | Hannuksela ............. 375/240.27 |
| 2008/0115176 | A1 | 5/2008 | Rodriguez |
| 2008/0117988 | A1 | 5/2008 | Toma et al. |
| 2008/0181228 | A1* | 7/2008 | Hannuksela et al. ......... 370/394 |
| 2008/0192830 | A1 | 8/2008 | Ahn et al. |
| 2009/0074078 | A1* | 3/2009 | Yamamoto et al. ..... 375/240.25 |
| 2011/0085779 | A1 | 4/2011 | Hattori |
| 2011/0150421 | A1 | 6/2011 | Sasaki et al. |
| 2011/0317771 | A1* | 12/2011 | Chen .................... G11B 27/007 375/240.25 |

FOREIGN PATENT DOCUMENTS

| | | |
|---|---|---|
| WO | 2006075635 A1 | 7/2006 |
| WO | 2012009686 A1 | 1/2012 |

OTHER PUBLICATIONS

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chen et al., "AHG15: Conforming bitstreams starting with CRA pictures", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG. 16); URL: http://wftp3.itu.int/av-arch/jvtvc-site/, No. JCTV-G319, Nov. 9, 2011, XP030110303 (6 pages).

Chen et al., "Response to the CfP on HTTP Streaming: Adaptive Video Streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499 (20 pages).

Chen Y., et al: "Comments on Clean Decoding Refresh Pictures", 5. JCT-VC Meeting; 96. MPEG Meeting; Mar. 16, 2011-Mar. 23, 2011; Geneva;(Joint Collaborative Team on Video Coding of ISO/IEC JTC1/SC29/WG11 and ITU-T SG.16); URL: http://wftp3.itu.int/av-arch/JC TVC-site/,,No. JCTVC-E400, Mar. 11, 2011 (Mar. 3, 2011) , XP030008906, ISSN: 0000-0005 (4 pages).

Hannuksela, "Signaling of Enhanced GOPs", 4. JVT Meeting; 61. MPEG Meeting; Jul. 22, 2002-Jul. 26, 2002; Klagenfurt, AT; (Joint Video Team of ISO/IEC JTC1/SC29/WG11 and ITU-T SG. 16 ) , No. JVT-D098, Jul. 26, 2002 XP030005372, ISSN: 0000-0441 (9 pages).

International Preliminary Report on Patentability—PCT/US2012/027884—The International Bureau of WIPO Geneva, Switzerland, May 22, 2013 (9 pages).

International Search Report and Written Opinion—PCT/US2012/027884—ISA/EPO—Jun. 19, 2012 (13 pages).

Wiegand, T., et al., "WD2: Working Draft 2 of High-Efficiency Video Coding", Jan. 28, 2011, No. JCTVC-D503, Jan. 28, 2011, 153 pp.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Second Written Opinion—PCT/US2012/027884—EPO—Feb. 7, 2013 (8 pages).

JVT-AD007, "Editor's draft revision to ITU-T Rec. H.264, ISO/IEC 14496-10 Advanced Video Coding—in preparation for ITU-T SG 16 AAP Consent (in integrated form)," 30th JVT meeting, Geneva, CH, Feb. 2009, available http://wftp3.itu.int/av-arch/jvt-site/2009_01_Geneva/JVT-AD007.zip.

Chen et al, "Dash Evaluation Experiment #7: Seamless Switching (SES)," International Organisation for Standardisation Organisation Internationale De Normalisation ISO/IEC JTC1/SC29/WG11 Coding of Moving Pictures and Audio, MPEG2010/m18014, Oct. 2010, 18 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Notice of Grounds for Rejection from corresponding Korean Application Serial No. 2013-7026462 dated Nov. 29, 2014 (8 pages).

Taiwan Search Report—TW101107530—TIPO—Jan. 26, 2015 (1 page).

Japanese Final Office Action from corresponding Japanese Application Serial No. 2013-557805 having a mailing date of Jan. 27, 2015 including translation (4 pages).

Tan, et al., "Clean Decoding Refresh Definition and Decoding Process", JCT-VC Meeting; MPEG Meeting; Jul. 14-22, 2011; Torino; (Joint Colloborative Team on Video Coding of ISO/IEC JTC1/SC29/WG11 and ITU-T SG.16); URL : http://wftp3.itu.int/av-arch/jctvc-site/, No. JCTVC-F381, XP030009404, 3 pp.

Wang, et al., "On CDR Picture", Joint Collaborative Team on Video Coding (JCT-VC) of ITU-T SG16 WP3 and ISO/IEC JTC1/SC29/WG11 6th Meeting: Torino, IT, Jul. 1, 2011, JCTVC-F464, 3 pp.

Korean Office Action from corresponding Korea Application Serial No. 2013-7026462 dated Jul. 24, 2015 including translation (6 pages).

* cited by examiner

BUFFER MANAGEMENT IN VIDEO CODECS

This application claims the benefit of U.S. Provisional Application No. 61/450,572, filed Mar. 8, 2011, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as pictures, and reference pictures may be referred to a reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for improved management of a reference picture memory, such as a decoded picture buffer (DPB), when pictures are used for random access. In particular, the techniques of this disclosure are directed to determining whether an open decoding refresh (ODR) picture has been used as a random access point (RAP) and selectively decoding subsequent pictures, in coding order. Such techniques may improve DPB performance and storage management by discarding pictures no longer needed for reference from the DPB. In accordance with techniques of the disclosure, when a video decoder determines that a current picture to be decoded is an ODR picture, the video decoder may determine whether the ODR picture is used for random access. The video decoder may, for example, determine whether a DPB used in video decoding includes a reference picture having a particular display order value that is less than the display order of the ODR picture. The display order value may be signaled as a syntax element for the ODR picture. When the reference picture corresponding to the signaled display order value is absent from the DPB, video decoder may determine that the ODR picture is used for random access. An ODR picture may be conceptually the same as the Clean Random Access (CRA) picture in HEVC.

The video decoder may, consequently, mark the pictures currently included in the DPB as unused for reference for further decoding of subsequent pictures when the ODR picture is used for random access. In this way, the video decoder may remove unused pictures from the DPB, thereby potentially improving storage management of the DPB. The techniques of the disclosure may also enable the video decoder to decode only subsequent pictures that have display orders that are greater than the display order of the ODR used for random access. In this manner, by decoding only subsequent pictures with display orders greater than the display order of the ODR, the video decoder may skip outputting of data for pictures having display order values less than a display order value of the ODR picture. Techniques of the present disclosure may therefore improve the performance of the video decoder by refraining from decoding pictures that will not be displayed or used as reference pictures for further decoding, which may improve processing efficiency and/or reduce battery drain in a mobile device or other battery powered coding device.

In one example, a method includes determining that an open decoding refresh (ODR) picture of video data is being used as a random access point. For example, the method may include determining, from data associated with an open decoding refresh (ODR) picture of video data, an identifier for a previous picture of the video data. The method may also include determining whether the previous picture is currently stored in a reference picture memory. The method may further include decoding only data for pictures of the video data having display order values that are greater than a display order value of the ODR picture when the previous frame is not stored in the reference frame memory. The method may also include skipping output of data for pictures having display order values less than a display order value of the ODR picture and decoding order values greater than a decoding order value of the ODR picture.

In another example, an apparatus for decoding video data includes a video decoder configured to determine that an open decoding refresh (ODR) picture of video data is being used as a random access point. For example, the video decoder may be configured to determine, from data associated with an open decoding refresh (ODR) picture of video data, an identifier for a previous picture of the video data, determine whether the previous picture is currently stored in a reference picture memory, and decode only data for pictures of the video data having display order values that are greater than a display order value of the ODR picture, when the previous picture is not stored in the reference picture memory. The video decoder may also be configured to skip outputting of data for pictures having display order values less than a display order value of the ODR picture and decoding order values greater than a decoding order value of the ODR picture.

In another example, a computer program product includes a computer-readable storage medium having stored thereon instructions that, when executed, cause a processor of a device for decoding video data to determine that an open decoding refresh (ODR) picture of video data is being used as a random access point. For example, the computer-readable storage medium may include instructions that, when executed, cause the processor of the device to determine, from data associated with an open decoding refresh (ODR) picture of video data, an identifier for a previous picture of the video data, determine whether the previous picture is currently stored in a reference picture memory, and decode only data for pictures of the video data having display order values that are greater than a display order value of the ODR picture, when the previous picture is not stored in the reference picture memory. The computer-readable storage medium may also include instructions that, when executed, cause the processor of the device to skip outputting of data for pictures having display order values less than a display order value of the ODR picture and decoding order values greater than a decoding order value of the ODR picture In another example, an apparatus for decoding video data includes means for determining that an open decoding refresh (ODR) picture of video data is being used as a random access point. For example, the apparatus may include means for determining, from data associated with an open decoding refresh (ODR) picture of video data, an identifier for a previous picture of the video data, means for determining whether the previous picture is currently stored in a reference picture memory, and means for decoding only data for pictures of the video data having display order values that are greater than a display order value of the ODR picture, when the previous picture is not stored in the reference picture memory. The apparatus may further include means for skipping output of data for pictures having display order values less than a display order value of the ODR picture and decoding order values greater than a decoding order value of the ODR picture.

In another example, a method of encoding video data includes encoding an open decoding refresh (ODR) picture, determining a previously coded picture having a display order value less than a display order value of the ODR picture and having a temporal identifier value equal to zero, and signaling syntax data for the ODR picture representative of an identifier of the determined previously coded picture to cause a video decoder to determine whether the ODR picture is being used for random access based on the identifier of the determined previously coded picture.

In another example, an apparatus for encoding video data is configured to encode an open decoding refresh (ODR) picture, determine a previously coded picture having a display order value less than a display order value of the ODR picture and having a temporal identifier value equal to zero, and signal syntax data for the ODR picture representative of an identifier of the determined previously coded picture to cause a video decoder to determine whether the ODR picture is being used for random access based on the identifier of the determined previously coded picture.

In another example, a computer program product includes a computer-readable storage medium having stored thereon instructions that, when executed, cause a processor of a device for decoding video data to encode an open decoding refresh (ODR) picture, determine a previously coded picture having a display order value less than a display order value of the ODR picture and having a temporal identifier value equal to zero, and signal syntax data for the ODR picture representative of an identifier of the determined previously coded picture to cause a video decoder to determine whether the ODR picture is being used for random access based on the identifier of the determined previously coded picture.

In another example, an apparatus for encoding video data includes means for encoding an open decoding refresh (ODR) picture, means for determining a previously coded picture having a display order value less than a display order value of the ODR picture and having a temporal identifier value equal to zero, and means for signaling syntax data for the ODR picture representative of an identifier of the determined previously coded picture to cause a video decoder to determine whether the ODR picture is being used for random access based on the identifier of the determined previously coded picture.

The details of one or more examples are set forth in the accompanying drawings and the description below. Other features, objects, and advantages will be apparent from the description and drawings, and from the claims.

DETAILED DESCRIPTION

Figure 1:
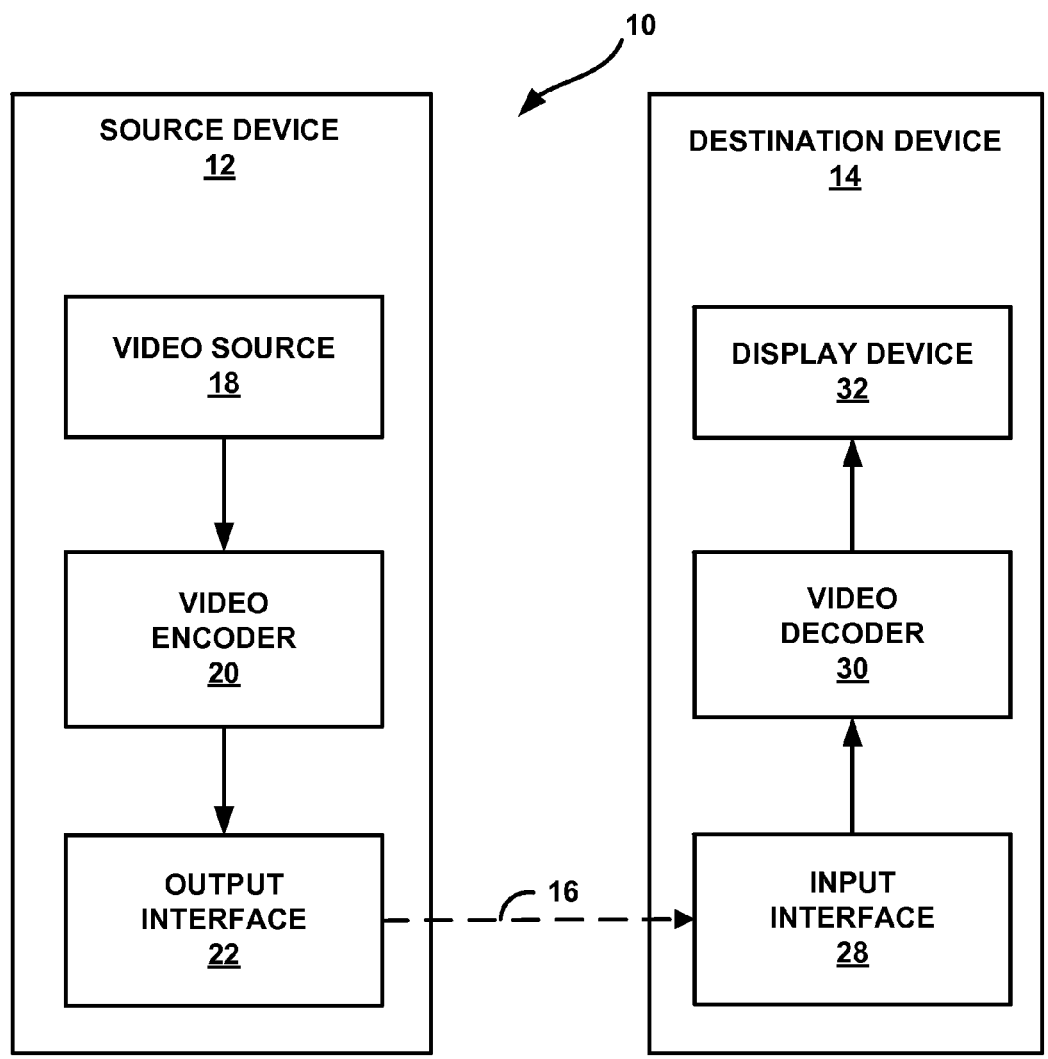
FIG. 1 is a block diagram illustrating an example video encoding and decoding system that may utilize techniques for improved management of a reference picture memory, in accordance with techniques of the disclosure.

In general, this disclosure describes techniques for improved management of a reference picture memory, such as a decoding picture buffer (DPB), when a random access picture is used for random access. In some examples, the techniques of this disclosure are directed to determining whether an open decoding refresh (ODR) picture has been used for random access and selectively decoding subsequent pictures to improve DPB performance and storage management. Moreover, when the ODR picture is used for a random access, these techniques allow a decoder to determine whether subsequent pictures in the bitstream can be properly decoded. One example of random access picture is an instantaneous decoding refresh (IDR) picture. An IDR picture is an independently decodable I-picture of a closed Group of Pictures (GOP). A closed GOP is a grouping of pictures of a video representation that does not include any pictures that depend on pictures prior to the GOP in either decoding or presentation order to be correctly decodable. An open GOP is such a group of pictures in which pictures preceding the initial intra picture in output order may not be correctly decodable. For example, an open GOP may include one or more pictures that depend at least in part on content of at least one picture preceding the open GOP.

An ODR picture may correspond to a random access point included in an open GOP. In some examples, an ODR picture may be an I-picture, in which all coded pictures that follow the ODR picture both in decoding order and output order do not use inter prediction from any picture that precedes the ODR picture either in decoding order or output order; and any picture that precedes the ODR picture in decoding order also precedes the ODR picture in output order. Although the ODR picture may be used for random access, some of the pictures in the open GOP following the ODR picture in coding order may not be correctly decodable when decoding commences from the ODR picture. In some examples, an I-picture of an open GOP may be used as a random access point (RAP) for the commencement of playback of a video representation.

When a video encoder uses more complex prediction structures, e.g., hierarchical B-picture coding structures, more pictures may be coded as ODR pictures, thereby introducing potential complexities into random access operations. For example, when a user is seeking from one picture to another, a conventional video decoder is configured to expect that video data in the bitstream will be decoded sequentially. Therefore, when the bitstream is not decoded sequentially, as may happen when beginning decoding from an ODR that is used for random access, the video decoder may attempt to decode all pictures in decoding order. Conventionally, if an ODR picture is used as a random access point, there are leading pictures following the ODR picture in the decoding order which might not be correctly decoded. Those leading pictures may be not needed for decoding. However, if the bitstream is decoded as normal, the leading pictures may need to be decoded. Without knowing the decoding status, it may not be possible to know whether those pictures are to be decoded or not. When starting decoding from an ODR picture, the pictures in the reference picture memory may, conventionally, not be marked as unused for reference e.g., because some explicit or implicit reference picture marking processes associated with the leading pictures are not invoked. This may lead to the inefficient memory management. The techniques of this disclosure, however, provide information usable by the video decoder to indicate pictures that cannot be correctly decoded, as well as information for more efficiently managing the DPB, e.g., to discard reference pictures from the DPB that would otherwise be stored but not used for reference and/or skipping output of data for some pictures.

Accordingly, in some example techniques of the disclosure, the decoder may perform automatic status checking to determine whether pictures needed to decode other pictures of an open GOP are present in a DPB. For instance, a video decoder may initially receive a network abstraction layer (NAL) unit that includes an ODR picture to be decoded that is used for random access. When in fact the NAL unit is the next NAL unit to be decoded in sequential order, reference pictures on which pictures of an open GOP included in the NAL unit should be present in the DPB of the video decoder. On the other hand, when reference pictures on which the pictures of the open GOP included in the NAL unit are not present in the DPB, e.g., when a user seeks to an out-of-order temporal location of the video data, the video decoder may be configured to determine that an ODR picture of the open GOP in the NAL unit is being used for random access. In accordance with the techniques of this disclosure, the NAL unit may include information that identifies a picture from a previous GOP, that is, a GOP that precedes the current GOP in the bitstream. If the signaled picture exists in the DPB, the video decoder may determine that the ODR picture is not used a random access point.

If the reference picture does not exist in the DPB, the video decoder determines that the ODR picture is used as a random access point and activates an ODR random access status, in accordance with the techniques of this disclosure. The video decoder may, consequently, mark the current pictures included in the DPB as unused for reference during decoding of subsequent pictures when the random access status is activated. In this way, the video decoder may remove unused pictures from the DPB, thereby improving storage management of the DPB. The techniques of the disclosure may also enable the video decoder to decode only pictures following the ODR picture in decoding order that have display order values that are greater than the display order value of the ODR used for random access. Thus, in some examples, techniques of the disclosure enable a video decoder to skip outputting pictures having display order values less than the display order value of the ODR picture and decoding order values greater than the decoding order value of the ODR picture. In this way, techniques of the present disclosure may improve the performance of the video codec by refraining from attempting to decode and output pictures that cannot be correctly decoded.

FIG. 1 is a block diagram illustrating an example video encoding and decoding system 10 that may utilize techniques for improved management of a reference picture memory, such as a decoding picture buffer (DPB), when pictures are signaled for random access. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for improved management of a decoding picture buffer (DPB) when a ODR picture is used for random access. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for improved management of a decoding picture buffer (DPB) when a picture is used for random access may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

In accordance with techniques of the present disclosure to improve management of a reference picture memory, video encoder 20, in some examples, initially receives video data from video source 18. Video encoder 20 may partition the video data into pictures, which may be subsequently encoded by video encoder 20. In some examples, video encoder 20 may group pictures together as a Group of Pictures (GOP). A GOP may be described as a grouping of sequential (in presentation order) pictures of a video sequence.

Figure 4:
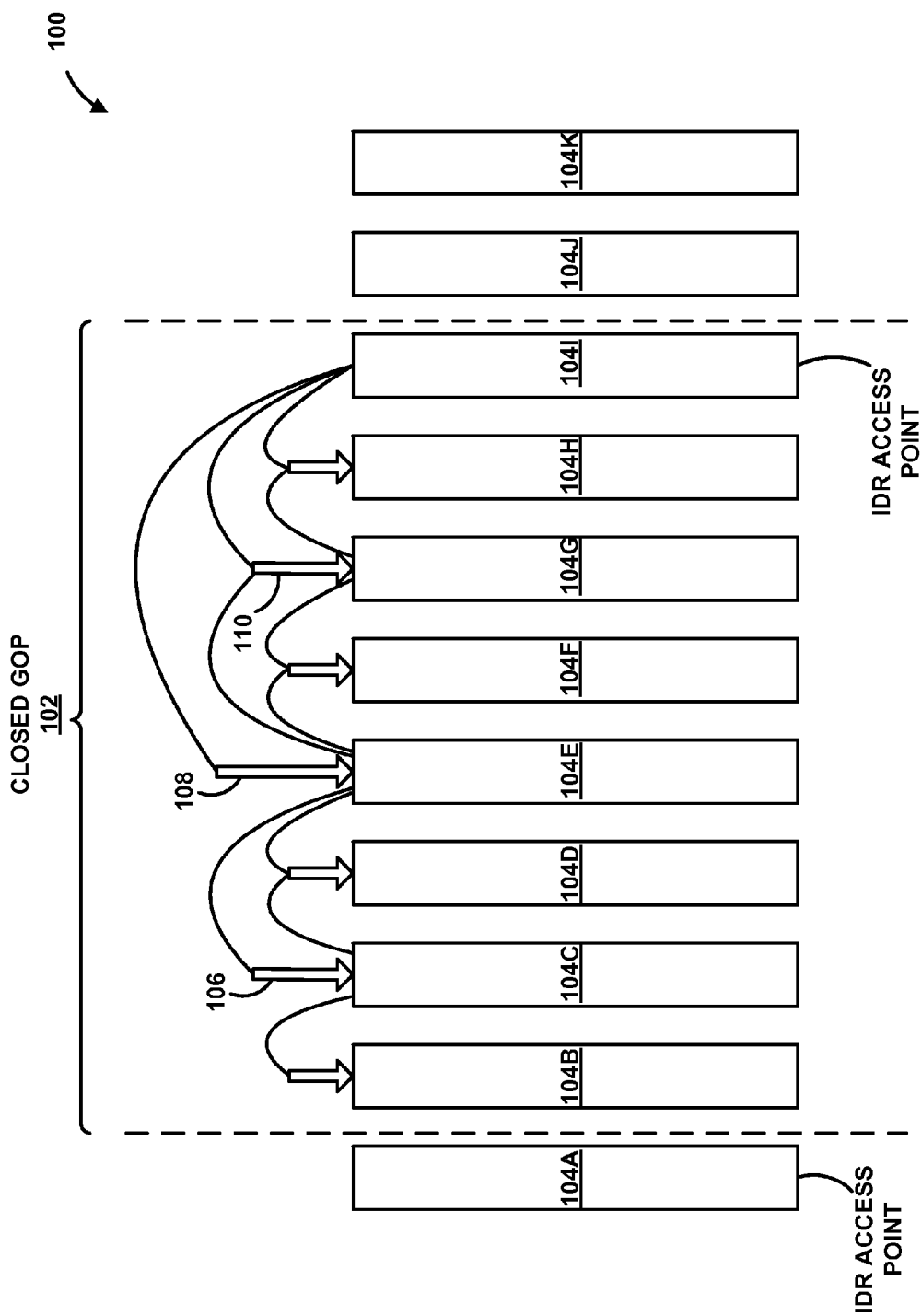
FIG. 4 is a conceptual diagram that illustrates one example of a video fragment that includes a closed group of pictures (GOP), in accordance with techniques of the disclosure.
Figure 5:
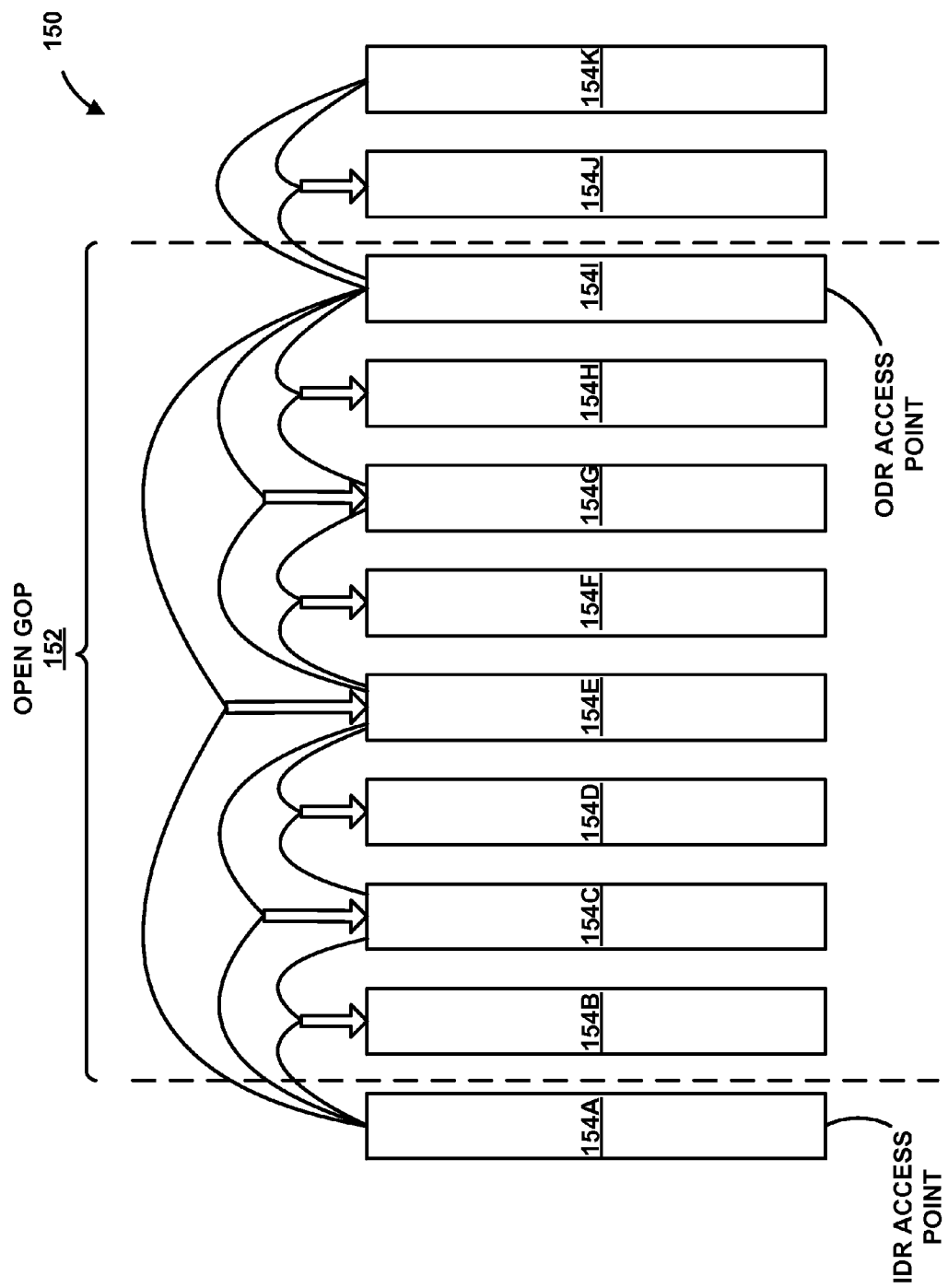
FIG. 5 is a conceptual diagram that illustrates one example of an open GOP that includes an open decoding refresh (ODR) access point, in accordance with techniques of the disclosure.

A display order of pictures included in a GOP may be different than a decoding order of the pictures. For example, a GOP may include any combination of I, B, or P-pictures. Intra-coded pictures (I-pictures) are those pictures that are independently decodable, meaning that to decode an I-picture, a decoder need not rely on content of other pictures. P-pictures may be inter-coded relative to one or more pictures in one direction. B-pictures may be inter-coded relative to one or more pictures in two directions. A GOP that includes only pictures that are correctly decodable without relying on content of pictures outside of the GOP may be considered a closed GOP. An open GOP, by contrast, includes pictures that depend from other pictures external to the GOP to be correctly decoded. FIGS. 4 and 5, further described herein, illustrate further details of a closed GOP 102 and open GOP 152.

Figure 2:
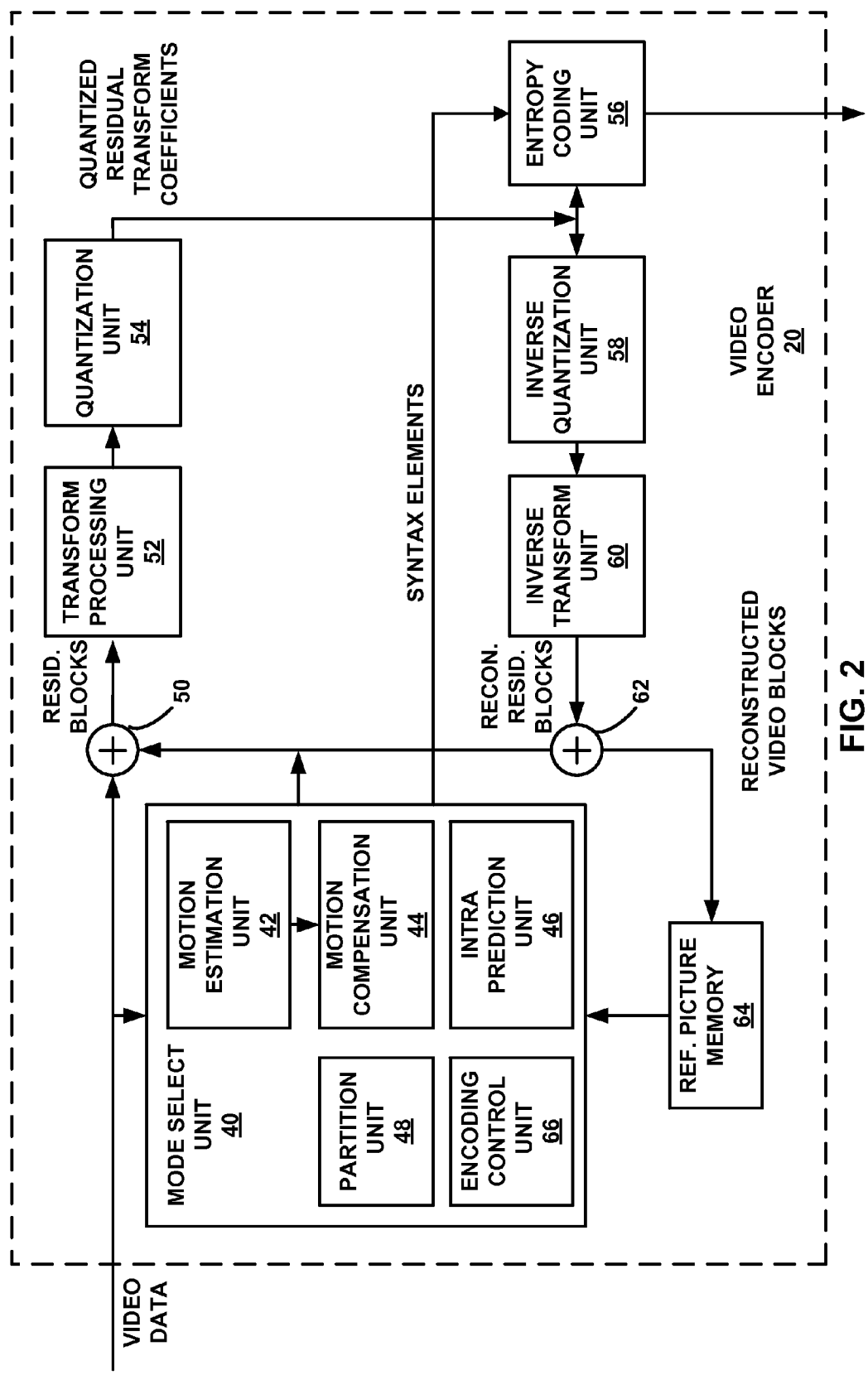
FIG. 2 is a block diagram illustrating an example of a video encoder that may implement techniques for improved management of a reference picture memory when pictures are signaled for random access, in accordance with techniques of the disclosure.
Figure 3:
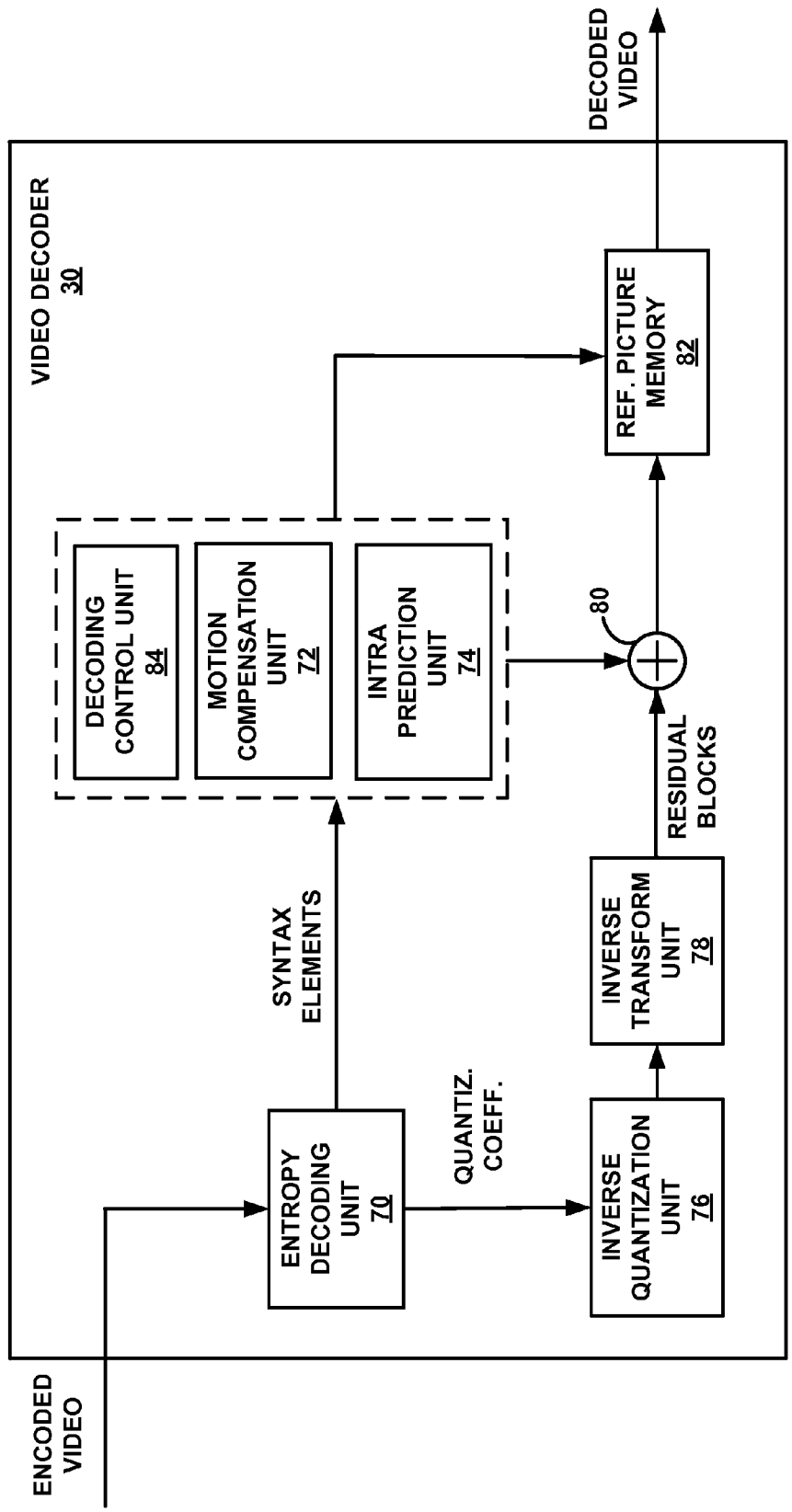
FIG. 3 is a block diagram illustrating an example of a video decoder that may implement techniques for improved management of a reference picture memory when pictures are signaled for random access, in accordance with techniques of the disclosure.

To encode video data as B or P-pictures, video encoder 20 may store reference pictures in a reference picture memory that B or P-pictures depend on for proper encoding. Reference pictures stored in a reference picture memory may include encoded pictures that precede a currently encoded picture in decoding order. Video encoder 20, in some examples, searches the reference pictures in the reference picture memory to identify one or more suitable reference pictures that the picture currently being encoded may reference. Examples of reference picture memories are shown in FIGS. 2 and 3 as reference picture memory 64 and 82, respectively. Similar to video encoder 20, video decoder 30 may also include a reference picture memory. Video decoder 30 may use the reference pictures stored in a reference picture memory of video decoder 30 to decode B and P-pictures. In this way, reference picture memories used by video encoder 20 and video decoder 30 may be used to encode and decode pictures of a GOP.

Source device 12 may further include an encapsulation unit (not shown), which may format the compressed video data for transmission into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data, such as a coded slice of video data. The second type of data stored to a NAL unit is referred to as non-VCL data, which includes additional information such as parameter sets that define header data common to a large number of NAL units and supplemental enhancement information (SEI). The encapsulation unit may send formed NAL units to destination device 14 via output interface 22.

Input interface 28 may receive the NAL units, which may pass the NAL units to a decapsulation unit (not shown). In some examples, the decapsulation unit decapsulates encoded video from NAL units in the order that the NAL units are received. Following decapsulation, video decoder 30 may receive the decapsulated video data from the decapsulation unit. Video decoder 30 then decodes the video data for display at display device 32. For instance, when video decoder 30 decodes pictures for display in sequential display order, pictures included in the video data are decoded and the decoded pictures are then stored in a reference picture memory of video decoder 30. The decoded pictures may then be used as reference pictures for subsequently decoded pictures. Because the reference picture memory may have finite storage space, video decoder 30 may mark pictures as unused for reference when no longer needed to decode pictures. Video decoder 30 may, consequently, remove unused reference pictures from the reference picture memory when no longer needed. In this way, pictures of a video sequence are decoded and displayed by video decoder 30 and display device 32.

In general, video decoders are configured to decode an entire bitstream following an instantaneous decoding refresh (IDR) picture. However, video decoder 30 may be configured to begin decoding a sequence of video data starting at an open decoding refresh (ODR) picture. This may occur in response to random access, e.g., a seek to a particular temporal location of the video sequence by a user. A randomly accessed picture may generally correspond to a picture that does not immediately follow the previously decoded picture in decoding order within the bitstream.

To illustrate an example of random access, a user may request to view a video that is displayed by display device 32. An application, such as a web browser or a media player, executing on destination device 14 may enable the user to control the display of the video. The video may be displayed based on pictures that are decoded by video decoder 30. In the current example, a user may provide input to randomly access a different location of the video, such that the input is received by the application. The application may identify a picture associated with the selected location and request the picture, e.g., from source device 12 during network streaming or from a storage medium accessible by input interface 28.

In response to receiving the identifier of the picture to select a new temporal location in the video of the current example, the application may identify a RAP picture that corresponds to the selected location of the video. In some examples, the RAP picture may be the closest ODR or IDR picture to the requested location of the video that precedes the picture of requested location in decoding order. Examples of an independently decodable pictures that video decoder 30 may use to provide random access include instantaneous decoding refresh (IDR) and open decoding refresh (ODR) RAP pictures. As previously described, an IDR picture is an independently decodable I-picture of a closed GOP, while an ODR picture is an I-picture of an open GOP.

The application may request encoded video data that begins with the RAP picture. In some examples, the request includes an identifier of the RAP picture. In response to receiving the request, source device 12 may use the identifier of the RAP picture begin sending a stream of encoded video data starting at the RAP picture to destination device 14. Video decoder 30 may subsequently begin decoding the stream of encoded video for display by display device 32.

In the example of starting with an IDR RAP picture, video decoder 30 may determine that the type of the RAP picture is an IDR RAP picture. Because, as previously described, an IDR RAP picture is included in a closed GOP, other pictures included in the closed GOP do not depend on reference pictures external to the GOP to be correctly decoded. Video decoder 30 may therefore mark all reference pictures currently stored in the reference picture memory as unused in response to determining that the RAP picture is an IDR RAP picture. Consequently, video decoder 30 may remove the unused reference pictures from the reference picture memory. In this way, video decoder 30 frees space in the reference picture memory to store the decoded IDR picture of the closed GOP and other subsequently decoded pictures included in the closed GOP.

In accordance with techniques of the present disclosure, random access may be extended to Open Decoding Refresh (ODR) pictures. Stated another way, an ODR picture may also be used for random access when video decoder 30 performs random access. An ODR picture is an I-picture of an open GOP that may be used for random access for the commencement of playback of a video representation.

When relatively complicated prediction structures are used, e.g., hierarchical B-picture coding structures, video encoder 20 may code more pictures as ODR pictures, thereby introducing complexities when a conventional client device performs random access. For example, when a user provides input to seek to a particular temporal location, a conventional video decoder is not prepared stop sequential decoding and decode from a selected random access point which is configured to expect that video data in the bitstream will be decoded sequentially. Therefore, when the bitstream is not decoded sequentially, as may happen when beginning decoding from an ODR RAP, the video decoder may attempt to decode all pictures in decoding order. The techniques of this disclosure, however, provide information usable by the video decoder to determine pictures that cannot be correctly decoded, as well as information for more efficiently managing the DPB, e.g., to discard reference pictures from the DPB that would otherwise be stored but not used for reference.

Techniques of the present disclosure may improve memory control of the reference picture memory of video decoder 30 by performing automatic status checking to determine whether an ODR picture has been selected for random access. In some example techniques, video encoder 20 may signal an identifier of a previous picture in a slice header of a slice of an ODR picture that video decoder 30 may use to determine whether the ODR picture has been selected for random access. If video decoder 30 determines that the previous picture signaled in the slice header is presently stored in the reference picture memory, video decoder 30 may determine that the ODR picture is not being used for random access, and decode the bitstream normally. On the other hand, if the previous picture signaled in the slice header is not presently stored in the reference picture memory, video decoder 30 may determine that the ODR picture is being used for random access. In response to determining that the ODR picture is being used for random access, video decoder 30 may mark pictures in the reference picture memory as unused, and in some examples, refrain from decoding pictures that are not required to perform further decoding of pictures that follow the ODR RAP in display order, e.g., pictures that cannot be properly decoded.

Initially, video encoder 20 may encode an ODR picture in a video sequence. During the encoding process, video encoder 20 may determine a particular previously encoded picture (or "previous picture") having a display order that is less than the display order of the ODR picture, and that is used to indicate whether the ODR picture is being used for random access. In some examples, one or more pictures of the open GOP (herein "leading pictures") that includes the encoded ODR picture may depend on the determined previous picture for proper decoding. Leading pictures may have a display order that is less than the ODR picture but a decoding order that is greater than the ODR picture. Video decoder 20 may determine the previous picture by determining, based all or in part on, whether one or more leading pictures of the open GOP depend on the previous picture. In some examples, the video encoder 20 may determine as the particular previously encoded picture, a picture that is the closest picture, in decoding and display order, prior to the ODR picture and that has a temporal level equal to 0.

When video encoder 20 determines the particular previous picture, video encoder 20 may signal an identifier of the previous picture in a slice header of a slice of the ODR picture (or each slice of the ODR picture). In some examples, the identifier may be a Picture Order Count (POC) value that indicates the display order of the previous picture. The POC value of the previous picture may be stored in the slice header or picture parameter set of the ODR picture. In one example, the slice header may include a syntax element identified by the name "pre_pic_POC." The pre_pic_POC value may specify the POC value of the particular previous picture determined by video encoder 20. Table 1 below indicates an example slice header of an ODR picture that includes a pre_pic_POC value, in accordance with aspects of the present disclosure. As can be seen in Table 1, the video encoder 20 sets the OdrPicFlag syntax element to true when the NAL unit type indicates that the slice is an ODR NAL unit or a flag in the NAL unit header indicates the slice is an ODR NAL unit.

TABLE 1

| slice_header( ) { | C | Descriptor |
|---|---|---|
| first_lctb_in_slice | 2 | ue(v) |
| slice_type | 2 | ue(v) |
| pic_parameter_set_id | 2 | ue(v) |
| picture_num | 2 | u(v) |
| if( IdrPicFlag ) | | |
| idr_pic_id | 2 | ue(v) |
| if (OdrPicFlag) | | |
| pre_pic_POC | 2 | ue(v) |
| } | | |

While a POC value of the previous picture was used to illustrate one example of an identifier of the previous picture, other values are also suitable. For instance, video encoder 20 may signal a value equal to the difference between the POC value of the previous picture and the POC value of the ODR picture in a slice header of a slice of the ODR picture. In another example, a decoding order value (e.g., a syntax element "picture_num") of the previous picture may be stored by video encoder 20 in the header of the slice. In still other examples, video encoder 20 may signal a value equal to the difference between the decoding order value of the previous picture and the decoding order value of the ODR picture in the header of the slice. In this manner, video encoder 20 may signal an identifier of the particular previous picture for an ODR picture, to indicate whether the ODR picture is being used for random access based on whether the particular previous picture is currently in the decoded picture buffer.

In the current example, after signaling the POC value of the previous picture in the slice header, an encapsulation unit may further encapsulate the ODR picture in a NAL unit (and/or encapsulate a picture parameter set signaling the identifier for the particular previous picture). Output interface 22 may subsequently send the NAL unit to destination device 14 along with other NAL units that include encoded video data. Input interface 28 may receive the NAL units and send the NAL units to video decoder 30. In some examples, a decapsulation unit may decapsulate encoded video data from the NAL units prior to decoding the encoded video data.

In one example, a user may provide input at destination device 14 to select a different temporal location of a currently playing video, or to select an initial starting point for a newly requested video that is other than the very beginning of the video. An ODR picture may be the closest picture to the randomly selected location and may therefore be used by video decoder 30 for random access. It should be understood that absent the signaled value for the ODR picture, video decoder 30 would not be capable of determining that the ODR picture is being used for random access. By including the signaled value of the particular previous picture for the ODR picture, however, the techniques of this disclosure allow video decoder 30 to determine whether the ODR picture is being used for random access. In the current example, because the user has selected a different temporal location of the currently playing video, video decoder 30 may receive encoded video data that begins with the ODR RAP picture. Video decoder 30 may subsequently begin decoding the stream of encoded video for display by display device 32.

In accordance with techniques of the present disclosure, video decoder 30 may begin decoding a bitstream at a particular picture. Video decoder 30 may determine whether a current picture is an ODR picture. For instance, video decoder 30 may determine whether a syntax element in a slice header of a slice in the picture indicates that the picture is an ODR picture. As one example, the OdrPicFlag variable as shown in Table 1 may be set to a value of true in the slice header of a slice in a picture to indicate the picture is an ODR picture.

Moreover, video decoder 30 may determine a value for a signaled identifier of a particular previous picture for the ODR picture, e.g., signaled in a slice header of a slice of the ODR picture or in a PPS corresponding to the ODR picture. For instance, video decoder 30 may identify a syntax element in the slice header of the slice in the ODR picture that identifies the particular previous picture. As described above, the ODR picture may include a pre_pic_POC syntax element, which indicates a display order value of the particular previous picture. Video decoder 30 may then determine whether the particular previous picture is stored in a reference picture memory of video decoder 30 by comparing the value of the pre_pic_POC syntax element with display order values (e.g., POC values) of pictures stored in the reference picture memory to identify a match.

If the previous picture is stored in the reference picture memory, video decoder 30 decodes pictures of the bitstream in a conventional manner. Consequently, video decoder 30 may maintain a status indicating that video decoder 30 is decoding pictures to provide normal, sequential display of pictures. In one example, a variable having a name "random_access" that maintains a value indicative of a random access status may be set to false when video decoder 30 determines that the previous picture is presently stored in the reference picture memory. Consequently, video decoder 30 may continue decoding subsequent pictures for normal, sequential display.

On the other hand, video decoder 30 may determine that the reference picture memory does not include the particular previous picture identified by the identifier associated with the ODR picture (e.g., the pre_pic_POC syntax element). In such examples, the user may have selected a different temporal location of a video. Consequently, video decoder 30 may determine that the ODR picture is being used for random access, based on the determination that the particular previous picture identified by the signaled value is not stored in the reference picture memory. Video decoder 30 may therefore set the random_access variable to true because video decoder 30 has determined that the ODR picture is being used for random access.

In the current example, video decoder 30, in response to determining an ODR picture is being used for random access, may mark pictures in the reference picture memory as unused for reference after decoding the ODR picture (other than the ODR picture itself). The random_access status may be left unchanged to the value of true after decoding the ODR picture. Video decoder 30 may subsequently delete the pictures from the reference picture memory having the unused status.

When video decoder 30 is performing random access (e.g., random_access is set to true), video decoder 30 may disregard certain memory management operations specified in slice headers of slices in video pictures, e.g., slices of the current, open GOP. For example, video decoder 30 may determine syntax information signaled in a slice of a picture that indicates at least one memory management process to be performed. Video decoder 30 may disregard the memory management process when performing random access, e.g., the random access status is activated. To illustrate, when not in random access mode, video decoder 30 may be configured to apply memory management techniques to mark decoded pictures in a reference picture memory as unused for reference in response to data specified in certain slice headers. Such techniques may include sliding window techniques or explicit marking techniques. However, when in random access mode, as determined by the techniques of this disclosure, video decoder 30 may not have actually decoded these pictures, and therefore, these pictures may not exist in the decoded picture buffer of the reference picture memory. Consequently, in accordance with techniques of the disclosure, when video decoder 30 determines it is performing random access, video decoder 30 may disregard such memory management operations specified in a slice header because reference pictures that are to be marked as unused may not exist in the reference picture memory. In this way, video decoder 30 may refrain from attempting to perform management operations on reference pictures that do not exist in the reference picture memory.

Video decoder 30 may also, in response to determining that the ODR picture is being used for random access, decode only data for pictures of the video data having display order values that are greater than a display order value of the ODR picture. For instance, when an ODR picture is being used for random access (e.g., random_access is set to true), video decoder 30 may further create a variable to store the POC value of the ODR RAP picture. In one example, the variable may be named "CurrODRPOC." Video decoder 30, upon determining that an ODR picture is being used for random access, may set CurrODRPOC to the POC value of the ODR picture. In some examples, video decoder 30 may, based on the determination that the ODR picture is being used as a random access point, skip outputting of data for pictures having display order values less than a display order value of the ODR picture and decoding order values greater than a decoding order value of the ODR picture.

As video decoder 30 receives subsequent NAL units from source device 12, video decoder 30 may parse the slice headers of slices included in each NAL unit. For each NAL unit, video decoder 30 may determine whether the POC value of the slice included in the NAL unit. For instance, in one example, video decoder 30 may compare the POC value of a slice included in a NAL unit to the POC value stored in CurrODRPOC. If the POC value of the slice is smaller than the POC value of the ODR RAP picture, video decoder 30 may skip decoding the encoded video data in the NAL unit. In this way, video decoder 30 may refrain from decoding video data of NAL units that are not required to decode from the selected ODR RAP picture. Video decoder 30 may also therefore skip outputting of such decoding video data of the NAL units. Consequently, techniques of the present disclosure may reduce unnecessary decoding of video data when video decoder 30 determines that an ODR RAP picture has been selected for random access. While the previous techniques parsed POC values of slice headers, techniques of the present disclosure may similarly parse syntax elements of, for example, a picture parameter set, which may include a POC value of a picture.

Video decoder 30, in some examples, may determine that the POC value of the slice in a NAL unit is larger than the POC value of the ODR RAP picture. In such examples, video decoder 30 may decode the slice. In response to determining that the POC value of the slice in a NAL unit is larger than the POC value of the ODR RAP picture, video decoder 30 may also change the random access status to indicate decoding of pictures for normal, sequential display of pictures rather than random access. For example, video decoder 30 may deactivate the random access status by setting random_access to false. In this way, video decoder 30 may change the random access status to indicate decoding of pictures for normal, sequential display of pictures rather than random access.

In some examples, one or more components that are separate from video decoder 30 and/or video encoder 20 may perform techniques of the present disclosure to detect random access. For instance, streaming systems based on Hypertext Transfer Protocol (HTTP) or local playback applications may include components that are separate from video decoder 30. In one example, a preprocessor component that is separate from video decoder 30 may receiving data for a request to begin playback from a particular temporal instance of the video data. The preprocessor component may identify the temporal instance based on a timestamp. If the preprocessor component determines that the closest RAP picture to the new temporal location is an ODR picture, the preprocessor component may determine that the display order of the ODR picture corresponds to the selected temporal instance of the video data. The timestamp may be a value that indicates a time at which the ODR picture is displayed in a video sequence. In response to determining that the ODR picture is used for random access, the preprocessor component may select information that indicates the timestamp of the ODR picture and send the information to video decoder 30. Video decoder 30 may consequently use the information to perform random access using techniques of the present disclosure.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

FIG. 2 is a block diagram illustrating an example of video encoder 20 that may implement techniques for improved management of a reference picture memory, such as a decoding picture buffer (DPB), when pictures are signaled for random access. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based prediction modes. Inter-modes, such as uni-directional prediction (P mode) or bi-prediction (B mode), may refer to any of several temporal-based prediction modes.

As shown in FIG. 2, video encoder 20 receives a current video block within a video picture to be encoded. In the example of FIG. 2, video encoder 20 includes mode select unit 40, reference picture memory 64, encoding control unit 66, summer 50, transform processing unit 52, quantization unit 54, and entropy coding unit 56. In some examples, reference picture memory 64 may be referred to in this disclosure as a picture buffer or decoding picture buffer. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal prediction. Intra-prediction unit 46 may alternatively perform intra-predictive coding of the received video block relative to one or more neighboring blocks in the same picture or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Video encoder 20 may send the encoded video data to an encapsulation unit. The encapsulation unit may format the encoded video data for transmission in the form of NAL units. Each NAL unit may include a header that identifies a type of data stored to the NAL unit. There are two types of data that are commonly stored to NAL units. The encapsulation unit may send the NAL units to an output interface which may send the NAL units to a destination device.

Video encoder 20 is now further described with respect to techniques of the present disclosure. Initially, video encoder 20 may encode an ODR picture in a video sequence. When video encoder 20 encodes an ODR picture, encoding control unit 66 may determine a previously encoded picture that has a display order that is less than the display order of the ODR picture. In some examples, encoding control unit 66 may search reference picture memory 64 to identify the previously encoded picture. Encoding control unit 66 may determine the previous picture by determining whether one or more pictures of an open GOP depend on the previous picture. For instance, one or more pictures of the open GOP (e.g., leading pictures) that includes the encoded ODR picture may depend on the previous picture for proper decoding. In some examples, encoding control unit 66 may determine an identifier for a previously coded picture that has a temporal layer equal to zero and that was the most recent previously decoded picture prior to the current ODR picture in decoding and display order.

When encoding control unit 66 determines the identifier for the previous picture, encoding control unit 66 may signal a value representative of the identifier for the previous picture in a slice header of a slice in the ODR picture. In some examples, the identifier may be a Picture Order Count (POC) value that indicates the display order of the previous picture. Encoding control unit 66 may store the POC value of the previous picture in a slice header of a slice of the ODR picture. In one example, the slice header may include a syntax element identified by the name "pre_pic_POC." The pre_pic_POC value may specify the POC value of the previous picture determined by encoding control unit 66.

After encoding control unit 66 has stored the POC value of the previous picture in the slice header of the slice in the ODR picture, the encapsulation unit may further encapsulate the ODR picture in a NAL unit. The encapsulation unit may send the NAL unit to an output interface that subsequently sends the NAL unit to a destination device along with other NAL units that include encoded video data. A destination device that includes a video decoder such as video decoder 30 may receive the NAL units and perform decoding of the one or more NAL units as further described in FIG. 3.

In some examples, encoding control unit 66 may determine the previous picture signaled in the ODR picture by comparing temporal level values of reference pictures stored in reference picture memory 64 to identify one or more reference pictures with a lowest temporal level value. A temporal level value may indicate decoding dependencies between one or more pictures. In one example, a lowest temporal level value may be a temporal level value of 0. Other temporal values may include numeric or alphanumeric values. Once encoding control unit 66 has identified one or more reference picture with a lowest temporal level, encoding control unit 66 may determine one of the reference pictures as the previous picture by identifying the reference picture that has a display order less than the display order of the ODR picture. In examples where encoding control unit 66 determines that more than one reference picture have a lowest temporal value, encoding control unit 66 may determine the reference picture that is closest in display order to the ODR picture and has a display order that is less than the ODR picture.

Encoding control unit 66, in some examples, may determine the previous picture signaled in the ODR picture by comparing the decoding order of the ODR picture with the decoding order of reference pictures stored in reference picture memory 64 to identify a reference picture with a decoding order that is nearest to the decoding order of the ODR picture. For instance, encoding control unit 66 may search the reference pictures stored in reference picture memory 64 to determine a reference picture as the previous picture which has a decoding order nearest to the decoding order of the ODR picture. Encoding control unit may only search for references pictures with a display order that is less than the ODR picture. In some examples, each picture has a decoding order value which encoding control unit 66 may use to determine the decoding order of each respective picture. Once encoding control unit 66 has identified a picture that is closest to the ODR picture in decoding order with a display order that is less than the ODR picture, encoding control unit 66 may determine the picture as the previous picture.

Encoding control unit 66, in some examples, may determine the previous picture signaled in the ODR picture by comparing the display order of the ODR picture with the display orders of reference pictures stored in reference picture memory 64 to identify a reference picture with a display order that is nearest to the display order of the ODR picture. For instance, encoding control unit 66 may search the reference pictures stored in reference picture memory 64 to determine a reference picture as the previous picture which has a display order nearest to the decoding order of the ODR picture. Encoding control unit 66 may only search for references pictures with a display order that is less than the ODR picture. Once encoding control unit 66 has identified a picture that is closest to the ODR picture in display order with a display order that is less than the ODR picture, encoding control unit 66 may determine the picture as the previous picture.

As previously described, encoding control unit 66 may determine a previous picture to be signaled in the ODR picture based on temporal level, decoding order, or display order. In some examples, encoding control unit 66 may determine a previous picture based all or in part on any combination of temporal level, decoding order, or display order to determine the previous picture. Encoding control unit 66 may also use additional techniques in some examples in combination with any of temporal level, decoding order, or display order to determine the previous picture.

As shown in FIG. 2, video encoder 20 is one example of a video encoder configured to encode an open decoding refresh (ODR) picture; determine a previously coded picture having a display order value less than a display order value of the ODR picture and having a temporal identifier value equal to zero; and signal syntax data for the ODR picture representative of an identifier of the determined previously coded picture to cause a video decoder to determine whether the ODR picture is being used for random access based on the identifier of the determined previously coded picture.

FIG. 3 is a block diagram illustrating an example of video decoder 30 that may implement techniques for improved management of a decoding picture buffer (DPB) when pictures are used for random access. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. In some examples, reference picture memory 82 may be referred to in this disclosure as a picture buffer or decoding picture buffer. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video picture is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 82 also stores decoded video for later presentation on a display device, such as display device 32 of FIG. 1.

As described above, video data of pictures decoded by video encoder 30 may be stored in reference picture memory 82. Decoding control unit 84 may perform memory management control operations to store and remove video data of reference pictures stored in reference picture memory 82. In some examples, decoding control unit 84 may implement techniques of the present disclosure to improve management of a reference picture memory in a video decoder when pictures are used for random access.

To illustrate an example of random access, a user may request to view a video that is displayed by a display device. An application, such as a web browser or a media player, may enable the user to control the display of the video. The video may be displayed based on pictures that are decoded by video decoder 30. In the current example, a user may provide input to randomly access a different location of the video, such that the input is received by the application. The application may identify a picture associated with the selected location and request the picture, e.g., from a source device during network streaming or from a storage medium accessible by an input interface. The application may request encoded video data that begins with the RAP picture. Video decoder 30 may receive the RAP picture from the application.

Video decoder 30 may use ODR or IDR pictures to provide random access to various locations of a coded video bitstream. Examples of an independently decodable pictures that video decoder 30 may use to provide random access include instantaneous decoding refresh (IDR) and open decoding refresh (ODR) RAP pictures. As previously described, an IDR picture is an independently decodable I-picture of a closed GOP, while an ODR picture is an I-picture of an open GOP.

In accordance with techniques of the present disclosure, decoding control unit 84 may initially receive the ODR RAP picture in a stream of encoded video for decoding. Decoding control unit 84 may determine whether the ODR RAP picture is an ODR picture. For instance, decoding control unit 84 may determine whether a syntax element in the slice header of a slice in the picture indicates that the picture is an ODR picture. As one example, an OdrPicFlag variable stored in the slice header of a slice in the ODR picture may be set to a value of true in the slice header to indicate the picture is an ODR picture. When decoding control unit 84 determines that the ODR RAP picture is an ODR picture, decoding control unit 84 may decode the picture.

Upon decoding the ODR RAP picture, decoding control unit 84 may determine an identifier of the previous picture that is stored in the header of a slice in the ODR picture. For instance, decoding control unit 84 may identify a syntax element in the slice header of a slice in the ODR picture that identifies the previous picture. As previously described in FIG. 1, the ODR picture may include a pre_pic_POC syntax element, which indicates a display order value of the previous picture. Decoding control unit 84 may then determine whether the previous picture is stored in a reference picture memory of decoding control unit 84 by comparing the value of the pre_pic_POC syntax element with display order values of pictures stored in the reference picture memory to identify a match.

In the current example, decoding control unit 82 may determine that reference picture memory 82 does not include the previous picture identified by the identifier stored in the ODR picture. Consequently, decoding control unit 84 may determine that the ODR picture is being used as an ODR RAP. Decoding control unit 84 may therefore set a random access status variable to true because decoding control unit 84 has determined that the ODR picture is being used for random access.

Decoding control unit 84, in response to determining an ODR picture is being used for random access, may mark pictures in reference picture memory 82 as unused for reference after decoding the ODR picture. In some examples, decoding control unit 84 may mark all pictures as unused. After decoding the ODR picture, decoding control unit 84 may leave the random access status unchanged. Decoding control unit 84 may subsequently delete the pictures from reference picture memory 82 that have been marked with the unused status.

In this manner, video decoder 30 of FIG. 3 represents an example of a video decoder configured to determine, from data associated with an open decoding refresh (ODR) picture of video data, an identifier for a previous picture of the video data; determine whether the previous picture is currently stored in a reference picture memory; and, decode only data for pictures of the video data having display order values that are greater than a display order value of the ODR picture when the previous picture is not stored in the reference picture memory.

When the random access status indicates decoding control unit 84 is performing random access, decoding control unit 84 may decode video data of pictures with display orders that are greater than a display order value of the ODR picture. For instance, when video decoder 30 uses an ODR picture as an ODR RAP (e.g., for random access), decoding control unit 84 may further create a variable to store the POC value of the ODR RAP picture. In one example, the variable may be named "CurrODRPOC." Decoding control unit 84, upon determining that an ODR picture is being used an ODR RAP, may set CurrODRPOC to the POC value of the ODR picture.

Decoding control unit 84 may parse the slice headers of slices included in each NAL unit that is subsequently received from source device 12. For each NAL unit, decoding control unit 84 may determine whether the POC value of the slice included in the NAL unit. For instance, in one example, decoding control unit 84 may compare the POC value of a slice included in a NAL unit to the POC value stored in CurrODRPOC. If the POC value of the slice is smaller than the POC value of the ODR RAP picture, decoding control unit 84 may skip decoding the encoded video data of the slice. In this way, such NAL units are not further decoded. Consequently, video decoder 30 may refrain from decoding video data of NAL units that are not required to decode from the selected ODR RAP picture. In some examples, in response to determining that the ODR picture is being used as a random access point, video decoder 30 may skip outputting of data for pictures having display order values less than a display order value of the ODR picture and decoding order values greater than a decoding order value of the ODR picture Thus, techniques of the present disclosure may reduce unnecessary decoding and outputting of video data when decoding control unit 84 determines that an ODR RAP picture has been selected for random access.

In one example, decoding control unit 84 may determine that the POC value of the slice is larger than the POC value of the ODR RAP picture. In such examples, the encoded video of the slice subsequently decoded. In response to determining that the POC value of the slice in a NAL unit is larger than the POC value of the ODR RAP picture, decoding control unit 84 may also change the random access status to indicate decoding of pictures for normal, sequential display of pictures rather than random access. For example, decoding control unit 84 may set the random access status variable to indicate decoding of pictures for normal, sequential display of pictures.

FIG. 4 is a conceptual diagram that illustrates one example of video fragment 100 that includes a closed group of pictures (GOP) 102. A GOP may be described as a grouping of sequential (in presentation order) pictures of a video sequence. A video fragment may include any number of GOPs similar to GOP 102.

The example of FIG. 4 depicts a portion of a video fragment 100. The video fragment includes a plurality of pictures 104A-104K. Fragment 100 may comprise one or more groups of pictures (GOPs), such as GOP 102. The one or more GOPs 102 may be described as a grouping of pictures of a video representation.

GOP 102 illustrated in FIG. 4 is an example of a closed GOP. That is, each of pictures 104B-104I can be decoded without reference to pictures external to GOP 102, e.g., pictures 104A, 104J, and 104K. As shown in FIG. 2, picture 104A precedes (in presentation order) the pictures 104B-104I of GOP 102. Pictures 104J-104K are subsequent to (in presentation order) pictures 104B-104I of GOP 102. Pictures 104A and 104J-104K may be part of another GOP of fragment 100.

A presentation order of pictures 104A-104K may be different than a decoding order of the pictures. For example, a GOP may include any combination of I, B, or P-pictures. Intra-coded pictures (I-pictures) are those pictures that are independently decodable, meaning that to decode an I-picture, a decoder need not rely on content of other pictures. In the example of FIG. 4, pictures 104A and 104I are examples of I-pictures. P-pictures may be inter-coded relative to one or more pictures in one direction. In the example of FIG. 4, pictures 104B, 104C, and 104E are examples of P-pictures. B-pictures may be inter-coded relative to one or more pictures in two directions. In the example of FIG. 4, pictures 104D, 104F, 104G, and 104H are examples of B-pictures.

As discussed above, according to the example of FIG. 4, a decoding order of pictures 104A-104K may be different than a presentation order of the pictures. For example, when decoding pictures 104B-104I, picture 104I (an I-picture) may be decoded first. As indicated by the arrow 108, picture 104E relies on content of picture 104I to be correctly decoded. As such, picture 104E may be decoded after picture 104I is decoded.

As indicated by arrow 106, picture 104C may rely on content of picture 104E to be correctly decoded. As indicated by arrow 110, picture 104G may rely on content of both pictures 104E and picture 104I to be correctly decoded. As such, in some examples, decoding of pictures 104C and 104G may occur after decoding of pictures 104I and 104E. Pictures 104B, 104D, 104F, and 104H each rely on content of one or more of pictures 104C, 104E, 104G, and 104I, respectively, and therefore may be decoded after pictures 104C, 104E, 104G, and 104I have been decoded.

As described above, an instantaneous decoding refresh (IDR) access point may be described as an access point of a closed GOP, e.g., GOP 102 in FIG. 4. A GOP including only pictures that are correctly decodable without relying on content of pictures outside of the GOP may be considered a closed GOP 102.

FIG. 4 depicts two examples of IDR access points. As shown in the FIG. 2 example, picture 104A does not rely on the content of any other picture to be correctly decodable, i.e., picture 104A does not include any arrow indicating reliance on another picture. Picture 104A may be considered a GOP in and of itself, because there are no pictures preceding picture 104A. As such, picture 104A may be considered an IDR access point, because picture 104A is an access point of a GOP that does not rely on the content of any pictures outside the GOP (consisting only of picture 104A) to be correctly decoded.

Picture 104I may also be considered an IDR access point of closed GOP 102. As shown in the FIG. 4, for example, picture 104I is an I-picture that is independently decodable without relying on the content of any other picture (e.g., pictures 104B-104H) of GOP 102. Although each of pictures 104B-104H rely on the content of other pictures within GOP 102 to be correctly decoded as described above, none of pictures 104B-104H rely on the content of any pictures outside of GOP 102. As such, GOP 102 may be considered a closed GOP that includes an IDR access point, namely picture 104I.

In accordance with techniques of the present disclosure, video decoder 30 as shown in FIGS. 1 and 3 may initially decode pictures for normal, sequential display. Video decoder 30 may therefore set a random access status to indicate that pictures are decoded for normal, sequential display. At a later time, video decoder 30 may receive an indication to randomly access picture 104F of video fragment 100. Consequently, video decoder 30 may identify the closest independently decodable picture usable to properly decode and display picture 104F.

In the current example, picture 104F depends on IDR picture 104I to be properly decoded, which is also the closest independently decodable picture to picture 104F in decoding order. Video decoder 30 may therefore determine that IDR picture 104I may be used for random access. Consequently, video decoder 30 may send a request to video encoder 20 for IDR picture 104I and subsequently decodable pictures that follow IDR picture 104I in decoding order. In response to receiving IDR picture 104I, video decoder 30 may determine whether IDR picture 104I is an IDR or ODR picture. Because picture 104I is an IDR picture, video decoder 30 leaves the random access status unchanged. Since the random access status indicates that pictures are decoded for normal, sequential display, video decoder 30 decodes IDR picture 104I and pictures 104E, 104G and 104F. Video decoder 30 may then send decoded picture 104F to a display device for display.

FIG. 5 is a conceptual diagram that illustrates one example of at least a portion of a video fragment 150 that includes an open GOP 152 that includes an open decoding refresh (ODR) access point. Similar to the example of FIG. 4, picture 154A is an I-picture and an IDR access point. Also similar to the example of FIG. 4, picture 154I is an I-picture corresponding to a random access point. However, the FIG. 5 example differs from the FIG. 4 example, in that pictures of GOP 152 prior to I-picture 154I in display order rely on the content of picture 154A in order to be correctly decodable. For example, as indicated by directional arrows, each of pictures 154B, 154C, and 154E directly rely on content of picture 154A. Pictures 154D, and 154F-154H each rely indirectly on the content of picture 154A, as each rely at least in part on the content of one or more of pictures 154B, 154C, and 154E to be correctly decoded. However, as also depicted in FIG. 5, pictures 154J and 154K, which follow I-picture 154I in display order, may be correctly decoded without reliance on any pictures prior to I-picture 154I. Thus, I-picture 154I may be an ODR used for random access.

In accordance with techniques of the present disclosure, video decoder 30 as shown in FIGS. 1 and 3 may initially decode pictures for normal, sequential display. Video decoder 30 may therefore set a random access status to indicate that pictures are decoded for normal, sequential display. At a later time, video decoder 30 may receive an indication to randomly access picture 154C of video fragment 150. For instance, a client device that includes video decoder 30 may receive an indication to begin display of a video at picture 154F. Consequently, video decoder 30 may identify the closest independently decodable picture usable to properly decode and display picture 154F.

In the current example, picture 154F depends on ODR picture 154I to be properly decoded, which is also the closest independently decodable picture to picture 154F in decoding order. Video decoder 30 may therefore determine that ODR picture 154I may be used for random access. Consequently, video decoder 30 may send a request to video encoder 20 for ODR picture 154I and subsequently decodable pictures that follow ODR picture 154I in decoding order. In response to receiving ODR picture 154I, video decoder 30 may determine whether ODR picture 154I is an IDR or ODR picture.

In the current example, video decoder 30, in response to determining an ODR picture is being used as an ODR RAP for random access, may set a random access status variable to true and mark pictures in the reference picture memory as unused for reference after decoding the ODR picture. Video decoder 30 may subsequently delete the pictures from the reference picture memory having the unused status.

As subsequent pictures are received while the random access variable is set to true, video decoder 30 may decode only data for pictures of the video data having display order values that are greater than a display order value of the ODR picture. For instance, when ODR picture 154I is being used for random access, video decoder 30 may further create a variable to store the POC value of the ODR RAP picture, such as CurrODRPOC as described in FIG. 1. Video decoder 30, upon determining that ODR picture 154I is being used an ODR RAP, may set CurrODRPOC to the POC value of the ODR picture. As video decoder 30 receives subsequent NAL units from source device 12, video decoder 30 may parse the slice headers of slices included in each NAL unit.

For each NAL unit, video decoder 30 may determine whether the POC value of the slice included in the NAL unit. For instance, in one example, video decoder 30 may compare the POC value of a slice included in a NAL unit to the POC value stored in CurrODRPOC. If the POC value of the slice is smaller than the POC value of the ODR RAP picture, video decoder 30 may skip decoding the encoded video data in the NAL unit. In this way, video decoder 30 may refrain from decoding video data of NAL units that are not required to decode from the selected ODR RAP picture. Video decoder 30 may also, in response to determining that an ODR picture is being used for random access, may skip outputting of data for pictures having display order values less than a display order value of the ODR picture and decoding order values greater than a decoding order value of the ODR picture. In the current example, video decoder 30 may therefore decode ODR picture 154I and pictures 154E, 154G and 154F. Video decoder 30 may then send decoded picture 154F to a display device for display.

Figure 6:
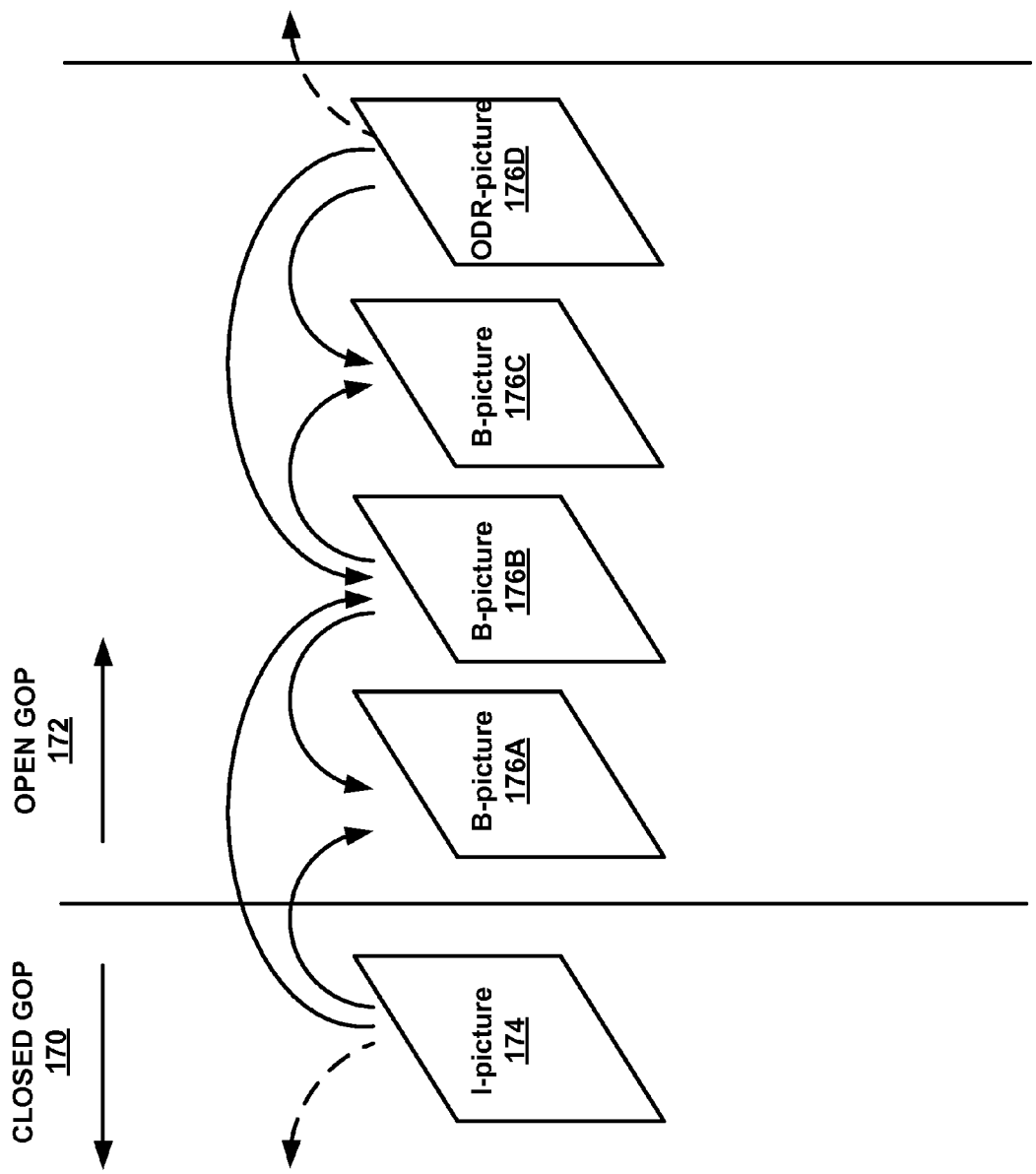
FIG. 6 is a conceptual diagram of an ODR picture and a previously encoded picture identified in the ODR picture, in accordance with techniques of the disclosure.

FIG. 6 is a conceptual diagram of an ODR picture and a previously encoded picture identified in the ODR picture, in accordance with techniques of the disclosure. FIG. 6 includes open GOP 170 and a closed GOP 172. As shown in FIG. 6, closed GOP 170 includes picture 174, which may be I-picture. Closed GOP 172 includes pictures 176. Included in pictures 176 are B-pictures 176A-176C and ODR picture 176D, which may be an independent decodable picture (e.g., I-picture). Initially, video encoder 20 (e.g., as shown in FIGS. 1 and 2) may encode ODR picture 176D in a video sequence. When video encoder 20 encodes ODR picture 176D, video encoder 20 may determine previously encoded picture 174 that has a display order that is less than the display order of ODR picture 176D. In some examples, video encoder 20 may search a reference picture memory to identify previously encoded picture 174. Video encoder 20 may determine previous picture 174 by determining whether one or more pictures of open GOP 172 depend on previous picture 174. For instance, pictures 176A-176C (e.g., leading pictures) of open GOP 172 that includes encoded ODR picture 176D may depend on previous picture 174 for proper decoding. In some examples, video encoder 20 may determine as the previously encoded picture, picture 174 that is the closest picture prior to ODR picture in decoding and display order that has a temporal level equal to 0. Unlike previous picture 174, pictures 176A-176C may have temporal levels that are greater than zero and therefore video encoder 20 may not select any of these pictures as the previous picture.

When video encoder 20 determines previous picture 174, video encoder 20 may signal an identifier of previous picture 174 in a header of a slice in ODR picture 176D. A header may be a slice header or picture parameter set. In some examples, the identifier may be a Picture Order Count (POC) value that indicates the display order of previous picture 174. Video encoder 20 may store the POC value of previous picture 174 in the slice header of a slice in ODR picture 176D. In one example, the slice header may include a syntax element identified by the name "pre_pic_POC." The pre_pic_POC value may specify the POC value of the previous picture determined by video encoder 20.

After video encoder 20 has stored the POC value of previous picture 174 in the header a slice in of ODR picture 176D, an encapsulation unit may further encapsulate ODR picture 176D in a NAL unit. An output interface may receive the NAL unit from the encapsulation unit and may subsequently send the NAL unit to a destination device along with other NAL units that include encoded video data for decoding.

Figure 7:
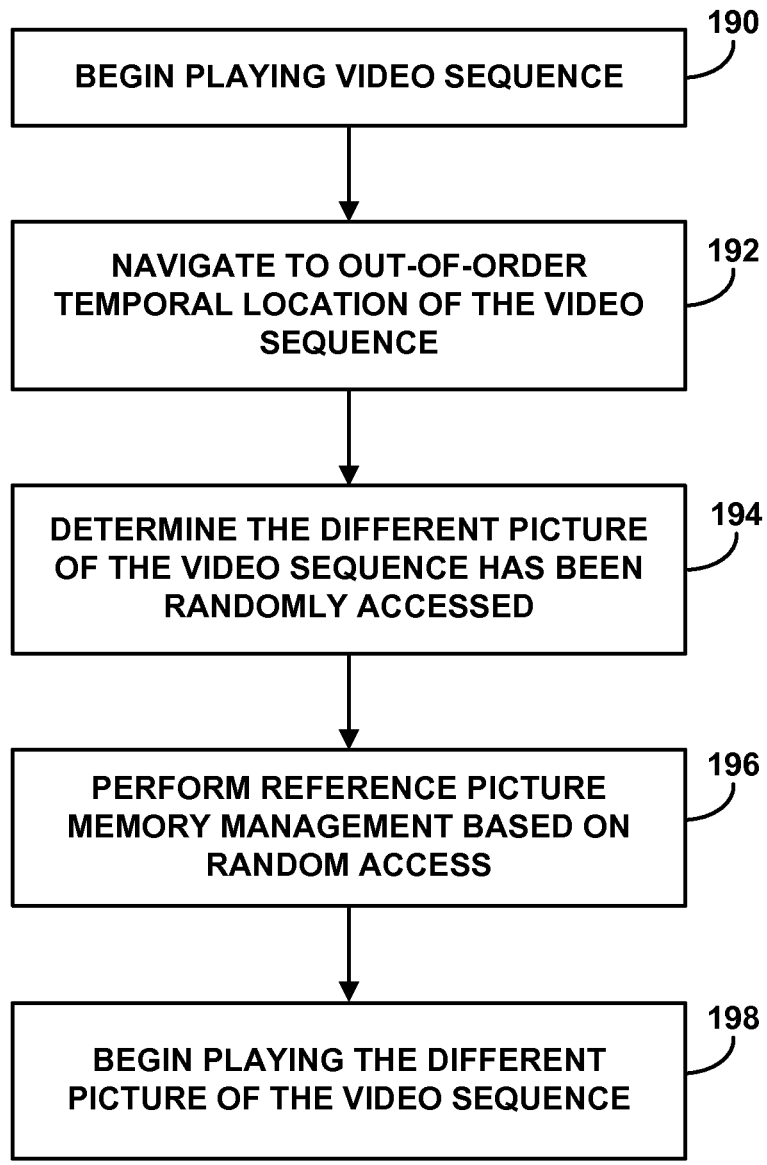
FIG. 7 is a flowchart illustrating operations that may be implemented by a video decoder, in accordance with techniques of the present disclosure.

FIG. 7 is a flowchart illustrating operations that may be implemented by a video decoder (e.g., as shown in FIGS. 1 and 3), in accordance with techniques of the present disclosure. The example operations of FIG. 7 will be described with respect to video decoder 30 as shown in FIGS. 1 and 3. As shown in FIG. 7, video decoder 30 may initially begin playing a video sequence (190). For example, a user may provide input to begin playback of video data at the start of a video sequence.

At a later point in time, the user may navigate to an out-of-order temporal location of the video sequence (192). In one example, the out-of-order temporal location may be a different picture of the video sequence that is not the next picture in display order. In such examples, video decoder 30 may therefore randomly access another picture in the video sequence. Video decoder 30 may apply techniques of the present disclosure to determine whether random access has occurred (194).

Figure 8A:
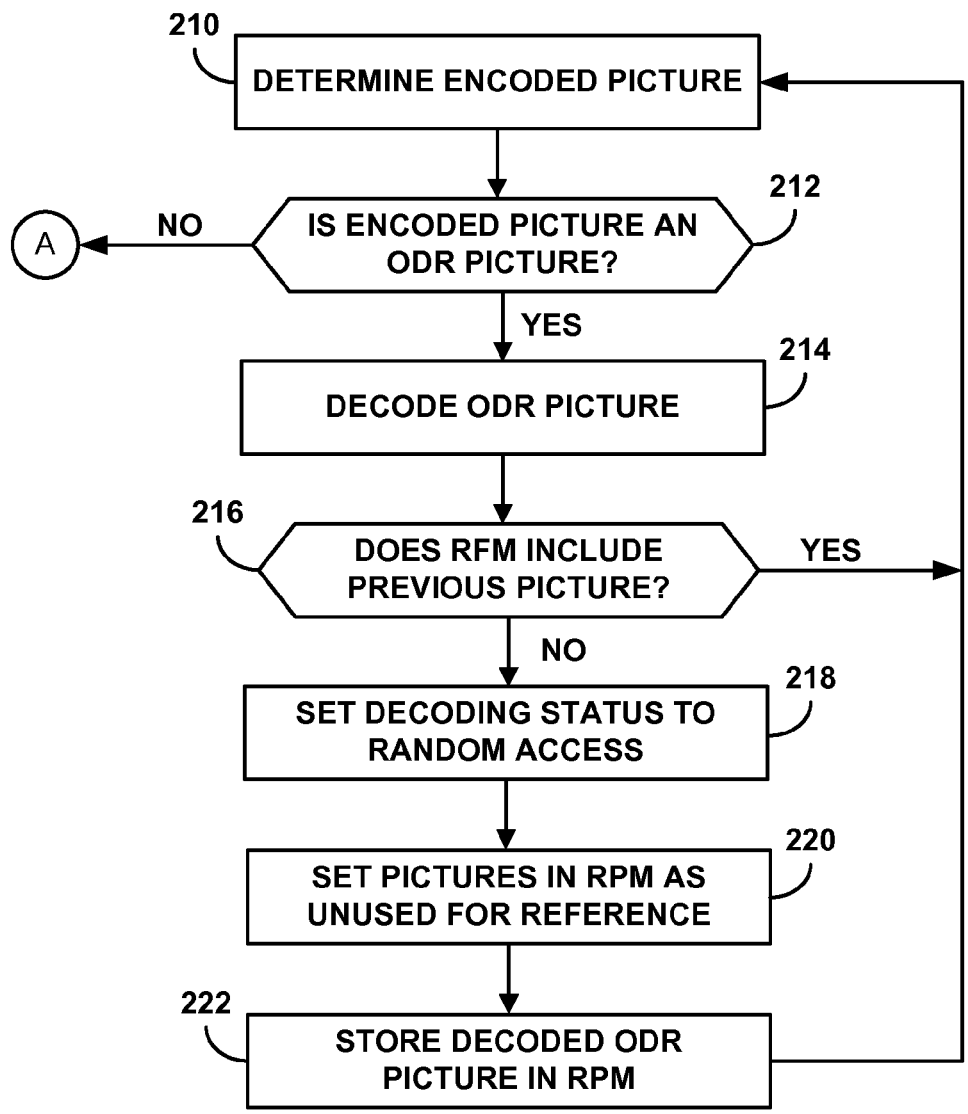
FIGS. 8A and 8B illustrate examples operations that may be performed by a video decoder in accordance with techniques of the present disclosure.
Figure 8B:
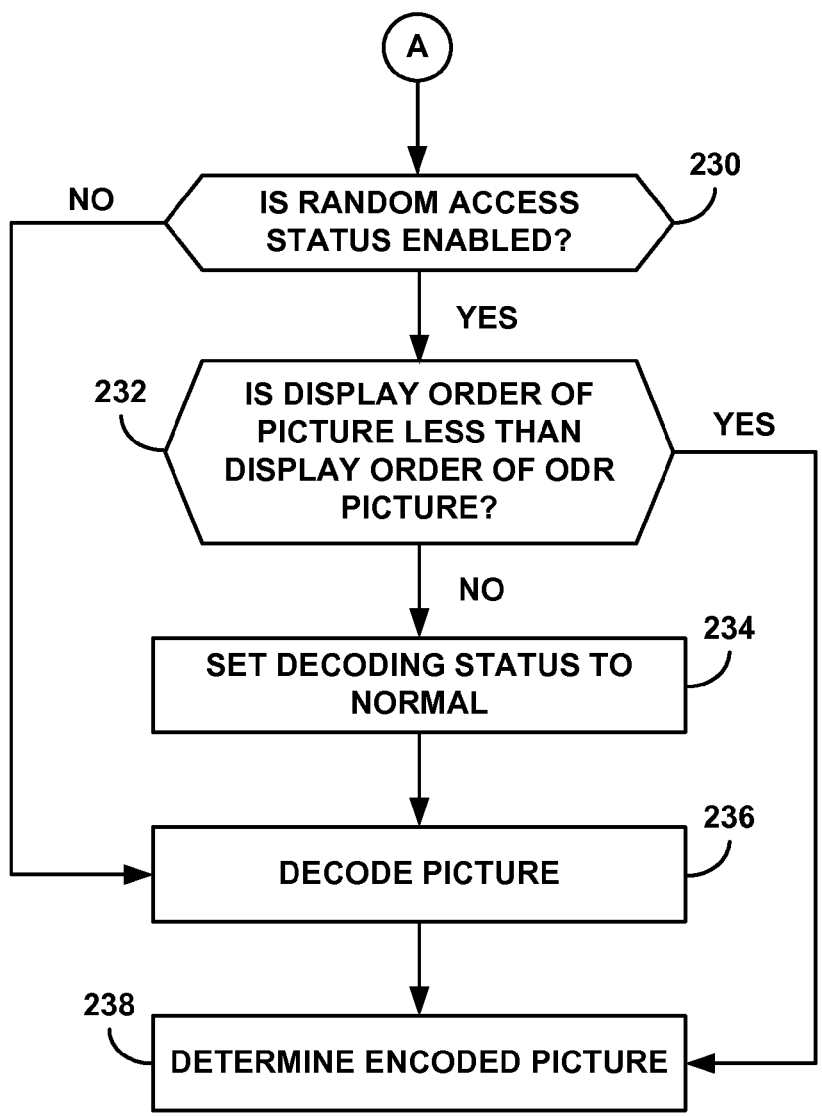

Video decoder 30 may perform reference picture memory management techniques based on random access as described in this disclosure (196). Operations performed to determine whether random access has occurred and perform reference picture memory management techniques are further described in FIGS. 8A and 8B. In the techniques of FIGS. 8A and 8B, video decoder 30 may mark pictures in a reference picture memory as unused and further decode only pictures necessary to begin playback at the randomly access picture of the video sequence. Upon determining whether random access has occurred and subsequently applying techniques of the present disclosure, video decoder 30 may begin playing the different picture of the video sequence (198). In this way, video decoder 30 may perform random access to access a different picture of the video sequence. Techniques to perform random access are now further described in FIGS. 8A and 8B.

FIGS. 8A and 8B are flowcharts that illustrate examples of operations that may be performed by a video decoder in accordance with techniques of the present disclosure. The example operations of FIG. 7 will be described with respect to video decoder 30 as shown in FIGS. 1 and 3. As shown in FIG. 8A, video decoder 30 may initially receive an indication (e.g., a user input) to decode a picture that does not follow the most recently decoded picture in decoding order. Consequently, video decoder 30 may determine the encoded picture identified by the indication (210). Video decoder 30 may determine whether the encoded picture is an ODR picture (212). If video decoder 30 determines the encoded picture is an ODR picture, video decoder 30 may decode the ODR picture (214).

Upon decoding the ODR picture, video decoder 30 may determine whether the reference picture memory (e.g., a decoding picture buffer) of video decoder 30 includes a previously encoded picture that is identified by the ODR picture (216). If the reference picture memory includes the previously encoded picture, video decoder 30 applies one or more conventional reference picture memory techniques to the reference picture memory and continues to selecting a subsequent encoded picture for decoding (210).

If the reference picture memory does not include the previously encoded picture identified by the ODR picture, video decoder 30 may set a random access status variable to indicate video decoder 30 is performing random access (218). Video decoder 30 may then mark pictures included in the reference picture memory as unused for reference (220). In this way, video decoder 30 may later remove the pictures marked as unused from the reference picture memory. After marking the pictures as unused for reference, video decoder 30 may store the decoded ODR picture in the reference picture memory (222). Video decoder 30 then determines the next encoded picture for decoding (210).

FIG. 8B illustrates operations that may be performed by a video decoder when an encoded picture to be decoded by the video decoder is not an ODR picture. When an encoded picture determined for decoding by video decoder 30 is not an ODR picture, video decoder 30 determines whether the random access status variable indicates that video decoder 30 is performing random access (230). If the random access status variable indicates video decoder 30 is not performing random access, video decoder 30 decodes the picture (232). Video decoder 30 may, output data for picture having a display order value that is greater than a display order value of the ODR picture. Video decoder 30 may then determine the next encoded picture in the video sequence for decoding (238).

As shown in FIG. 8B, when video decoder 30 determines the random access status variable indicates that video decoder 30 is performing random access, video decoder 30 may determine whether the display order of the picture determined for decoding is less than the display order of the ODR picture (232). In this manner, video decoder 30 may determine that an open decoding refresh (ODR) picture of video data is being used as a random access point. If the display order of the picture selected for decoding is less than the display order of the ODR picture, video decoder 30 may leave the decoding status variable unchanged to indicate that video is performing random access. Consequently, video decoder 30 refrains from further decoding the selected picture. Video decoder 30 may therefore refrain from outputting data for pictures having display order values less than a display order value of the ODR picture and decoding order values greater than a decoding order value of the ODR picture. Video decoder 30 may then determine the next encoded picture for decoding (238).

In some examples, video decoder 30 may determine that the display order of the picture selected for decoding is greater than the display order of the ODR picture (232). In this manner, video decoder 30 may determine that an open decoding refresh (ODR) picture of video data is being used as a random access point. Consequently, video decoder 30 may set the random access status variable to indicate that video decoder 30 is no longer performing random access, i.e., video decoder 30 is performing normal decoding of video pictures (234). After setting the random access status variable to indicate video decoder 30 is performing normal decoding of video pictures, video decoder 30 may decode the selected picture (236). Video decoder 30 may then determine a next encoded picture for decoding (238).

In this manner, the method of FIGS. 8A and 8B represents an example of a method that includes determining that an open decoding refresh (ODR) picture of video data is being used as a random access point; and based on the determination, skipping output of data for pictures having display order values less than a display order value of the ODR picture and decoding order values greater than a decoding order value of the ODR picture.

Figure 9:
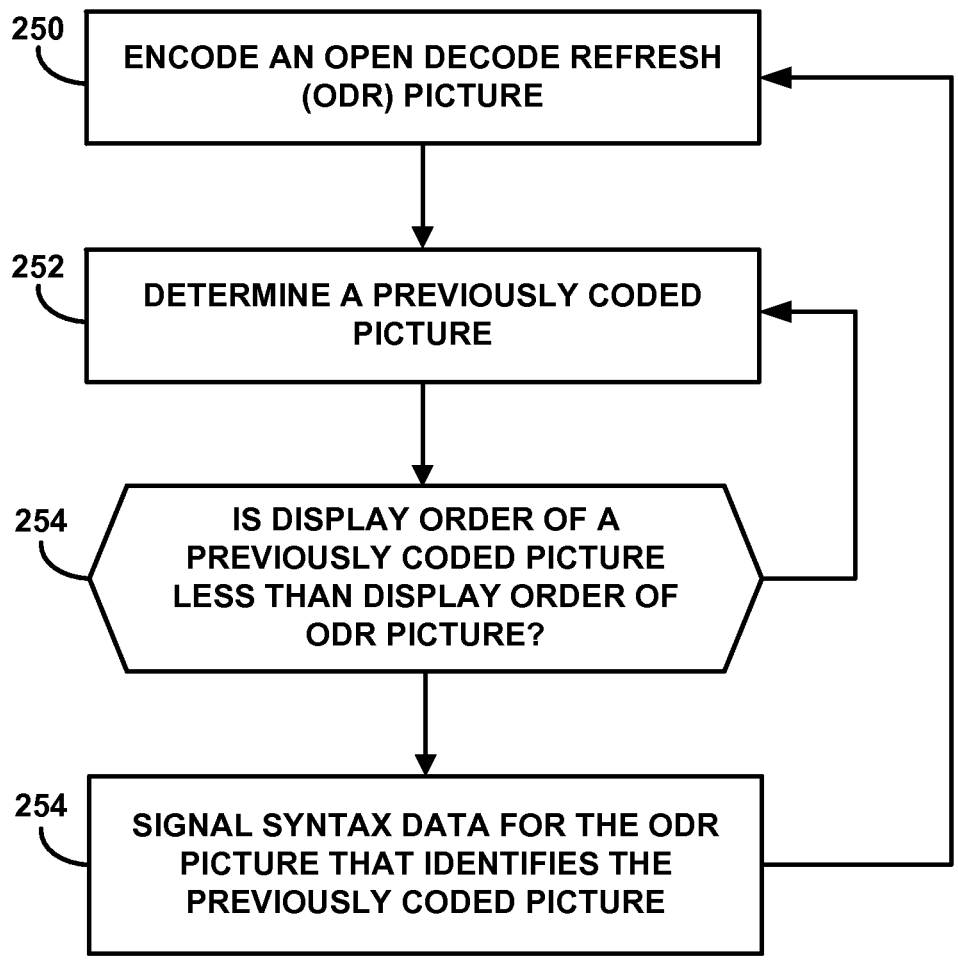
FIG. 9 illustrates operations that may be performed by a video encoder to signal a previous picture in syntax data of ODR picture to enable random access techniques of the present disclosure.

FIG. 9 illustrates operations that may be performed by a video encoder to signal a previous picture in syntax data of ODR picture to enable random access techniques of the present disclosure. As shown in FIG. 9, a video encoder, such as video encoder 20 in FIGS. 1 and 2, may encode an ODR picture (250). Video encoder 20 may determine a picture that was previous encoded by video encoder 20 (252). Upon determining the picture, video encoder 20 may determine whether the previously coded picture has a display order that is less than the display order of the ODR picture (254). Video encoder 20 may further determine whether the temporal level value of the previously encoded picture is zero. When the previously coded picture has a display order that is less than the display order of ODR picture and a temporal level of zero, video encoder 20 may signal syntax data for the ODR picture that identifies the previously coded picture (256). By signaling the previously coded picture in syntax data of the ODR picture, a video decoder may subsequently use the syntax data when performing random access techniques as described in the disclosure. In some examples, video encoder 20 may determine the display order of the determined picture is not less than the display order of the ODR picture. In such examples, video encoder 20 may determine another previously coded picture, and subsequently determine whether the display order is less than the ODR picture and has a temporal level equal to zero.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining a value for a syntax element for an open decoding refresh (ODR) picture of video data, wherein the value for the syntax element represents an identifier for a previous picture of video data;
   determining, using the identifier, whether the previous picture is currently stored in a reference picture memory;
   determining whether the ODR picture of video data is being used as a random access point based on whether the previous picture is in the reference picture memory, comprising determining that the ODR picture is being used as the random access point when the previous picture is not in the reference picture memory; and
   based on the determination that the ODR picture of video data is being used as a random access point, skipping output of data for pictures having display order values less than a first display order value of the ODR picture and having decoding order values greater than a decoding order value of the ODR picture, wherein skipping output comprises:
      determining whether a second display order value associated with a current picture is less than the first display order value of the ODR picture; and
      based on the second display order value being less than the first display order value, skipping decoding of the current picture; or
      based on the second display order value being greater than the first display order value, decoding the current picture and pictures following the current picture in decoding order.

2. The method of claim 1, further comprising:
   decoding, based on the previous picture not being in the reference picture memory, only data for pictures of the video data having display order values that are greater than a display order value of the ODR picture.

3. The method of claim 1, further comprising, in response to determining that the previous picture is not stored in the reference picture memory, storing the ODR picture in the reference picture memory.

4. The method of claim 1, further comprising:
   activating a random access status in response to determining that the previous picture is not stored in the reference picture memory;
   in response to receiving the current picture of the video data, determining whether the random access status is activated; and
   based on the random access status not being activated, decoding the current picture of the video data.

5. The method of claim 1, further comprising:
   setting each picture stored in the reference picture memory as unused for reference based on the determination that the previous picture is not stored in the reference picture memory.

6. The method of claim 5, further comprising deleting each picture set as unused for reference from the reference picture memory.

7. The method of claim 1, further comprising:
   receiving syntax information signaled in a slice of a picture, wherein the syntax information indicates at least one memory management process to be performed, and
   disregarding the memory management process in response to determining that the previous picture is not stored in the reference picture memory.

8. The method of claim 1, further comprising:
   receiving data for a request to begin playback from a particular temporal instance of the video data;
   determining that the display order value of the ODR picture corresponds to the temporal instance; and determining the ODR picture for decoding based on the determination.

9. The method of claim 1, further comprising parsing pictures of the video data that have display order values that are less than the display order value of the ODR picture and that have decoding order values that are greater than a decoding order value of the ODR picture.

10. The method of claim 1, further comprising:
outputting data for pictures having display order values greater than a display order value of the ODR picture.

11. An apparatus for decoding video data, the apparatus comprising a video decoder configured to:
determine a value for a syntax element for an open decoding refresh (ODR) picture of video data, wherein the value for the syntax element represents an identifier for a previous picture of video data;
determine, using the identifier, whether the previous picture is currently stored in a reference picture memory;
determine whether the ODR picture of video data is being used as a random access point based on whether the previous picture is in the reference picture memory, wherein the video decoder is configured to determine that the ODR picture is being used as the random access point when the previous picture is not in the reference picture memory; and
based on the determination that the ODR picture of video data is being used as a random access point, skip output of data for pictures having display order values less than a display order value of the ODR picture and having decoding order values greater than a decoding order value of the ODR picture, wherein to skip output, the video decoder is configured to:
determine whether a second display order value associated with a current picture is less than the first display order value of the ODR picture; and
based on the second display order value being less than the first display order value, skip decoding of the current picture; or
based on the second display order value being greater than the first display order value, decode the current picture and pictures following the current picture in decoding order.

12. The apparatus of claim 11, wherein the video decoder is further configured to:
decode, based on the previous picture not being in the reference picture memory, only data for pictures of the video data having display order values that are greater than a display order value of the ODR picture, when the previous picture is not stored in the reference picture memory.

13. The apparatus of claim 11, wherein the video decoder is further configured to:
store the ODR picture in the reference picture memory in response to determining that the previous picture is not stored in the reference picture memory.

14. The apparatus of claim 11, wherein the video decoder is further configured to:
activate a random access status in response to determining that the previous picture is not stored in the reference picture memory;
determine whether the random access status is activated, in response to receiving the current picture of the video data; and
decode the current picture of the video data, based on the random access status not being activated.

15. The apparatus of claim 11, wherein the video decoder is further configured to:
set each picture stored in the reference picture memory as unused for reference based on the determination that the previous picture is not stored in the reference picture memory.

16. The apparatus of claim 15, wherein the video decoder is further configured to:
delete each picture set as unused for reference from the reference picture memory.

17. The apparatus of claim 11, wherein the video decoder is further configured to:
receive syntax information signaled in a slice of a picture, wherein the syntax information indicates at least one memory management process to be performed, and
disregard the memory management process in response to determining that the previous picture is not stored in the reference picture memory.

18. The apparatus of claim 11, wherein the video decoder is further configured to:
receive data for a request to begin playback from a particular temporal instance of the video data;
determine that the display order value of the ODR picture corresponds to the temporal instance; and
determine the ODR picture for decoding based on the determination.

19. The apparatus of claim 11, wherein the video decoder is further configured to:
parse pictures of the video data that have display order values that are less than the display order value of the ODR picture and that have decoding order values that are greater than a decoding order value of the ODR picture.

20. The apparatus of claim 11, wherein the video decoder is configured to output data for pictures having display order values greater than a display order value of the ODR picture.

21. A non-transitory computer program product comprising a computer-readable storage medium having stored thereon instructions that, when executed, cause a processor of a device for decoding video data to:
determine, a value for a syntax element for an open decoding refresh (ODR) picture of video data, wherein the value for the syntax element represents an identifier for a previous picture of video data;
determine, using the identifier, whether the previous picture is currently stored in a reference picture memory;
determine whether the ODR picture of video data is being used as a random access point based on whether the previous picture is in the reference picture memory, comprising instructions that cause the processor to determine that the ODR picture is being used as the random access point when the previous picture is not in the reference picture memory; and
based on the determination that the ODR picture of video data is being used as a random access point, skip output of data for pictures having display order values less than a display order value of the ODR picture and having decoding order values greater than a decoding order value of the ODR picture, wherein the instructions that cause the processor to skip output comprise instructions that cause the processor to:
determine whether a second display order value associated with a current picture is less than the first display order value of the ODR picture; and
based on the second display order value being less than the first display order value, skip decoding of the current picture; or based on the second display order value being greater than the first display order value, decode the current picture and pictures following the current picture in decoding order.

22. The computer program product of claim 21, further comprising instructions that cause the processor to:
decode, based on the previous picture not being in the reference picture memory, only data for pictures of the video data having display order values that are greater than a display order value of the ODR picture, when the previous picture is not stored in the reference picture memory.

23. The computer program product of claim 21, further comprising instructions that cause the processor to:
store the ODR picture in the reference picture memory, in response to determining that the previous picture is not stored in the reference picture memory.

24. The computer program product of claim 21, further comprising instructions that cause the processor to:
activate a random access status in response to determining that the previous picture is not stored in the reference picture memory;
determine whether the random access status is activated, in response to receiving the current picture of the video data; and
decode the current picture of the video data, based on the random access status not being activated.

25. The computer program product of claim 21, further comprising instructions that cause the processor to:
set each picture stored in the reference picture memory as unused for reference based on the determination that the previous picture is not stored in the reference picture memory.

26. The computer program product of claim 25, further comprising instructions that cause the processor to:
delete each picture set as unused for reference from the reference picture memory.

27. The computer program product of claim 21, further comprising instructions that cause the processor to:
receive syntax information signaled in a slice of a picture, wherein the syntax information indicates at least one memory management process to be performed, and
disregard the memory management process in response to determining that the previous picture is not stored in the reference picture memory.

28. The computer program product of claim 21, further comprising instructions that cause the processor to:
receive data for a request to begin playback from a particular temporal instance of the video data;
determine that the display order value of the ODR picture corresponds to the temporal instance; and
determine the ODR picture for decoding based on the determination.

29. The computer program product of claim 21, further comprising instructions that cause the processor to:
parse pictures of the video data that have display order values that are less than the display order value of the ODR picture and that have decoding order values that are greater than a decoding order value of the ODR picture.

30. The computer program product of claim 21, further comprising instructions that cause the processor to:
output data for pictures having display order values greater than a display order value of the ODR picture.

31. An apparatus for decoding video data, the apparatus comprising:
means for determining, a value for a syntax element for an open decoding refresh (ODR) picture of video data, wherein the value for the syntax element represents an identifier for a previous picture of video data;
means for determining, using the identifier, whether the previous picture is currently stored in a reference picture memory;
means for determining whether the ODR picture of video data is being used as a random access point based on whether the previous picture is in the reference picture memory, comprising means for determining that the ODR picture is being used as the random access point when the previous picture is not in the reference picture memory; and
means for skipping, based on the determination that the ODR picture of video data is being used as a random access point, output of data for pictures having display order values less than a display order value of the ODR picture and having decoding order values greater than a decoding order value of the ODR picture, wherein the means for skipping output comprises:
means for determining whether a second display order value associated with a current picture is less than the first display order value of the ODR picture; and
means for skipping decoding of the current picture based on the second display order value being less than the first display order value; or
means for decoding the current picture and pictures following the current picture in decoding order based on the second display order value being greater than the first display order value.

32. The apparatus for decoding video data of claim 31, further comprising:
means for decoding, based on the previous picture not being in the reference picture memory, only data for pictures of the video data having display order values that are greater than a display order value of the ODR picture, when the previous picture is not stored in the reference picture memory.

33. The apparatus for decoding video data of claim 31, further comprising:
means for storing the ODR picture in the reference picture memory, in response to determining that the previous picture is not stored in the reference picture memory.

34. The apparatus for decoding video data of claim 31, further comprising:
means for activating a random access status in response to determining that the previous picture is not stored in the reference picture memory;
means for determining whether the random access status is activated, in response to receiving a current picture of the video data; and
means for decoding the current picture of the video data, based on the random access status not being activated.

35. The apparatus for decoding video data of claim 31, further comprising:
means for setting each picture stored in the reference picture memory as unused for reference based on the determination that the previous picture is not stored in the reference picture memory.

36. The apparatus for decoding video data of claim 35, further comprising:
means for deleting each picture set as unused for reference from the reference picture memory.

37. The apparatus for decoding video data of claim 31, further comprising:
- means for receiving syntax information signaled in a slice of a picture, wherein the syntax information indicates at least one memory management process to be performed, and
- means for disregarding the memory management process in response to determining that the previous picture is not stored in the reference picture memory.

38. The apparatus for decoding video data of claim 31, further comprising:
- means for receiving data for a request to begin playback from a particular temporal instance of the video data;
- means for determining that the display order value of the ODR picture corresponds to the temporal instance; and
- means for determining the ODR picture for decoding based on the determination.

39. The apparatus for decoding video data of claim 31, further comprising:
- means for parsing pictures of the video data that have display order values that are less than the display order value of the ODR picture and that have decoding order values that are greater than a decoding order value of the ODR picture.

40. The apparatus for decoding video data of claim 31, further comprising:
- means for outputting data for pictures having display order values greater than a display order value of the ODR picture.

\* \* \* \* \*